US012271256B2

(12) United States Patent
Porter et al.

(10) Patent No.: US 12,271,256 B2
(45) Date of Patent: Apr. 8, 2025

(54) ANOMALY DIAGNOSIS FOR TIME SERIES DATA

(71) Applicant: Falkonry Inc., Cupertino, CA (US)

(72) Inventors: Joseph Porter, Nolensville, TN (US); Vukasin Toroman, Karlsruhe (DE); Daniel Kearns, Half Moon Bay, CA (US); Namrata Rao, Fremont, CA (US); Nikunj R. Mehta, Cupertino, CA (US)

(73) Assignee: Falkonry Inc., Cupertino, CA (US)

( * ) Notice: Subject to any disclaimer, the term of this patent is extended or adjusted under 35 U.S.C. 154(b) by 110 days.

(21) Appl. No.: 17/976,575

(22) Filed: Oct. 28, 2022

(65) Prior Publication Data

US 2024/0143425 A1   May 2, 2024

(51) Int. Cl.
*G06F 11/00* (2006.01)
*G06F 11/07* (2006.01)

(52) U.S. Cl.
CPC ...... *G06F 11/0751* (2013.01); *G06F 11/0721* (2013.01)

(58) Field of Classification Search
CPC .......... G06F 11/0751; G06F 11/0721
USPC ..................................... 714/1–57
See application file for complete search history.

(56) References Cited

U.S. PATENT DOCUMENTS

| 6,717,576 B1 | 4/2004 | Hong et al. |
| 7,385,608 B1 | 6/2008 | Baldwin |
| 7,697,816 B2 | 4/2010 | Takada et al. |
| 10,902,062 B1 | 1/2021 | Guha et al. |
| 11,080,127 B1 | 8/2021 | Vincent et al. |

(Continued)

FOREIGN PATENT DOCUMENTS

| CN | 109710636 B | 10/2022 |
| KR | 102482240 B1 | 12/2022 |

(Continued)

OTHER PUBLICATIONS

Vaswani et al., Ashish, "Attention Is All You Need", 31st Conference on Neural Information Processing Systems (NIPS 2017), Dec. 6, 2017, pp. 1-15.

(Continued)

*Primary Examiner* — Sarai E Butler
(74) *Attorney, Agent, or Firm* — Duane Morris LLP

(57) ABSTRACT

An anomaly diagnosis system obtains a plurality of anomaly signals corresponding to a plurality of sensor signals of a physical system and segments one or more anomaly signals into a plurality of time segments. The system determines an anomaly score for each time segment based on anomaly values of the one or more anomaly signals during the time segment and identifies an anomaly time interval corresponding to at least one consecutive time segment within the plurality of time segments. The system clusters the plurality of anomaly signals within the anomaly time interval to identify an anomaly group of sensor signals associated with the anomaly time interval and determines an aggregate anomaly score for the anomaly group. The system generates a graphical user interface presenting a representation of the anomaly group of sensor signals and the aggregate anomaly scores and causes the graphical user interface to be displayed on a user device.

20 Claims, 13 Drawing Sheets

(56) References Cited

U.S. PATENT DOCUMENTS

| | | | |
|---|---|---|---|
| 11,797,836 | B1 | 10/2023 | Evans |
| 11,841,699 | B2 | 12/2023 | Sayyarrodsari et al. |
| 2012/0007868 | A1 | 1/2012 | Buck |
| 2012/0278663 | A1* | 11/2012 | Hasegawa ............ G06F 11/079 714/47.1 |
| 2013/0262035 | A1 | 10/2013 | Mills |
| 2013/0318011 | A1* | 11/2013 | Jones ............... G05B 23/0243 706/12 |
| 2015/0033086 | A1* | 1/2015 | Sasturkar ............ G06F 11/079 714/57 |
| 2015/0169393 | A1* | 6/2015 | Shibuya ............ G05B 23/0243 702/182 |
| 2015/0222495 | A1 | 8/2015 | Mehta et al. |
| 2016/0004585 | A1* | 1/2016 | Slama ............... G06F 11/0745 714/57 |
| 2016/0080438 | A1 | 3/2016 | Liang |
| 2016/0203176 | A1 | 7/2016 | Mills |
| 2017/0206464 | A1 | 7/2017 | Clayton et al. |
| 2017/0228460 | A1 | 8/2017 | Amel et al. |
| 2017/0255709 | A1 | 9/2017 | Cho et al. |
| 2017/0317874 | A1 | 11/2017 | Borah |
| 2018/0032312 | A1 | 2/2018 | Hansen et al. |
| 2018/0039555 | A1* | 2/2018 | Salunke ............ G06F 11/3006 |
| 2018/0053109 | A1* | 2/2018 | Caffrey ............ G06F 11/0751 |
| 2018/0060155 | A1* | 3/2018 | Tran Van ............ G06F 11/079 |
| 2019/0095508 | A1 | 3/2019 | Porath et al. |
| 2019/0147300 | A1 | 5/2019 | Bathen et al. |
| 2019/0188065 | A1* | 6/2019 | Anghel ............ G06F 11/0778 |
| 2019/0258677 | A1 | 8/2019 | Beedgen et al. |
| 2020/0012657 | A1 | 1/2020 | Walters et al. |
| 2020/0050182 | A1 | 2/2020 | Cheng et al. |
| 2020/0064822 | A1 | 2/2020 | Song et al. |
| 2020/0073740 | A1* | 3/2020 | Ohana ............... G06F 11/0793 |
| 2020/0082013 | A1 | 3/2020 | Triplet et al. |
| 2020/0097351 | A1* | 3/2020 | Raghavan ............ G06F 16/353 |
| 2020/0134441 | A1* | 4/2020 | Suthar ..................... G06F 9/50 |
| 2020/0167652 | A1 | 5/2020 | Huang et al. |
| 2020/0226490 | A1 | 7/2020 | Abdulaal |
| 2020/0234474 | A1 | 7/2020 | Mittelstdt |
| 2020/0292608 | A1 | 9/2020 | Yan et al. |
| 2020/0334254 | A1 | 10/2020 | Arye et al. |
| 2020/0348662 | A1 | 11/2020 | Cella et al. |
| 2020/0379454 | A1 | 12/2020 | Trinh et al. |
| 2021/0026747 | A1* | 1/2021 | Garion ............... G06F 11/3476 |
| 2021/0035266 | A1 | 2/2021 | Toroman et al. |
| 2021/0056430 | A1* | 2/2021 | Wu .................... G06N 3/006 |
| 2021/0117268 | A1* | 4/2021 | Koeberl ............ G06F 11/0709 |
| 2021/0124983 | A1 | 4/2021 | Axenie et al. |
| 2021/0125387 | A1 | 4/2021 | Kawata et al. |
| 2021/0149384 | A1 | 5/2021 | Dittmer et al. |
| 2021/0157312 | A1 | 5/2021 | Cella et al. |
| 2021/0247754 | A1 | 8/2021 | Takahashi et al. |
| 2022/0012538 | A1 | 1/2022 | Mizoguchi et al. |
| 2022/0180478 | A1 | 6/2022 | Toroman et al. |
| 2022/0195861 | A1 | 6/2022 | Patino Virano et al. |
| 2022/0198264 | A1* | 6/2022 | Guo ..................... G06N 3/08 |
| 2022/0237102 | A1* | 7/2022 | Bugdayci ............ G06F 11/327 |
| 2023/0061808 | A1 | 3/2023 | Gillian |
| 2023/0085991 | A1 | 3/2023 | Liebman |
| 2023/0091197 | A1* | 3/2023 | Edwards ............... G16H 40/40 714/37 |

FOREIGN PATENT DOCUMENTS

| | | |
|---|---|---|
| TW | 202141212 A | 11/2021 |
| WO | 2023059432 A1 | 4/2023 |

OTHER PUBLICATIONS

Devlin, Jacob et al., "BERT: Pre-training of Deep Bidirectional Transformers for Language Understanding", May 24, 2019, 16 pages.

The International Searching Authority, "Search Report" in application No. PCT/US2020/043735, dated Oct. 9, 2020, 15 pages.

Jugel et aL, "M4 Visualization-Oriented Time Series Data Aggregation", dated Jun. 30, 2014, pp. 797-808.

Current Claims in application No. PCT/US2020/043735, dated Oct. 2020, 4 pages.

Battle et al., "Dynamic Prefetching of Data Tiles or Interactive Visualization", dated Jun. 30, 2016, SIGfVIOD Proceedings of the 2016 International Conference on Management of Data, pp. 1363-1375.

International Search Report and Written Opinion for Application No. PCT/US2023/075303, Mailed Feb. 2, 2024, 15 pages.

Zekai Chen et al: "Learning.Graph Structures .with Transformer for Multivariate Time Series Anomaly Detection in IoT", arxiv.org, Cornell University Library, 201 Olin Library Cornell University Ithaca, NY 14853, Jan. 17, 2022, 12 pages.

International Search Report and Written Opinion for Application No. PCT/US2023/078115, Mailed Mar. 1, 2024, 13 pages.

Patil, Sangram, et al. "Ensembles of Ensemble Machine Learning Approach for Fault Detection of Bearing." Solid State Technology, vol. 63, (Year: 2020).

Chen, Lioun Wee. "A Hierarchical Decision Process for Fault Administration." ProQuest Dissertations & Theses, 1991. Print. (Year: 1991).

Madani, Seyed Sohail, et al. "Islanding Detection for PV and DFIG Using Decision Tree and Ada Boost Algorithm." IEEE Pes Innovative Smart Grid Technologies Conference Europe (ISGT Europe) (Year: 2012).

\* cited by examiner

FIG. 9A  900

| SCORE | START TIME | TOP ASSET | TOP COMPONENT | TOP SIGNAL | DURATION | TOTAL SIGNALS | |
|---|---|---|---|---|---|---|---|
| 4.1 | 2017-08-27 07:00:00 PM | Turbine 9 | Controller | ambient temperature | 1 Day | 01 | View Details |
| 10+ | 2017-05-01 09:00:00 PM | Turbine 22 | Main Shaft & Gearbox | oil temperature | 3 Days | 04 | View Details |
| 7.5 | 2017-03-22 11:00:00 AM | Turbine 15 | Transformer | transformer temperature | 5 Days | 01 | View Details |
| 5.4 | 2016-12-12 08:00:00 PM | Turbine 29 | Transformer | voltage phase t | 3 Days | 05 | View Details |
| 3.2 | 2016-09-23 02:03:25 PM | Turbine 2 | Main Shaft & Gearbox | oil temperature | 12 Minutes | 10 | View Details |
| 5.5 | 2016-07-11 01:23:12 PM | Turbine 2 | Generator | generator rpm | 3 Minutes | 08 | View Details |

ANOMALY DIAGNOSIS FOR TIME SERIES DATA

RELATED APPLICATIONS

This application is related to co-pending U.S. patent application Ser. No. 17/493,800, filed Oct. 4, 2021, and U.S. patent application Ser. No. 17/956,827, filed Sep. 30, 2022, the entire contents of which are hereby incorporated by reference as if fully set forth herein.

FIELD OF THE INVENTION

The present invention relates to processing of time series data and management of complex physical systems, and, more particularly, to anomaly diagnosis and remediation for time series data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Complex systems operations cannot be fully understood only from their design or simulation. Instrumentation and data analysis are required to develop adequate understanding of the operations of such complex systems. Operating complex physical systems, such as industrial machines, requires interpreting the instrumentation data from numerous sensors so that operational objectives can be met and operational problems can be solved. These sensors produce sensor signals that over time form large amounts of time series data, which can lead to tremendous processing and storage overhead. Data analysis to solve operational problems is made difficult by the number of sensors involved in complex systems and the volume of time series data as a result of which a large amount of human effort is required. Needless to say, undetected or unresolved operational problems tend to have significant business impact. In particular, the amount of time series data can make it prohibitively difficult for users to identify when an anomalous behavior arises in a physical system and to identify which signals contribute to that anomaly, and to determine solutions to individual anomalous behavior. It would be helpful to effectively process and analyze all time series data from the instrumentation data, to enable timely identification and diagnosis of potential anomalies in the operation of the physical system.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 9A is an example screen of an anomaly diagnosis GUI showing anomaly groups with associated metadata labels in accordance with an illustrative embodiment.

DETAILED DESCRIPTION

Figure 1:
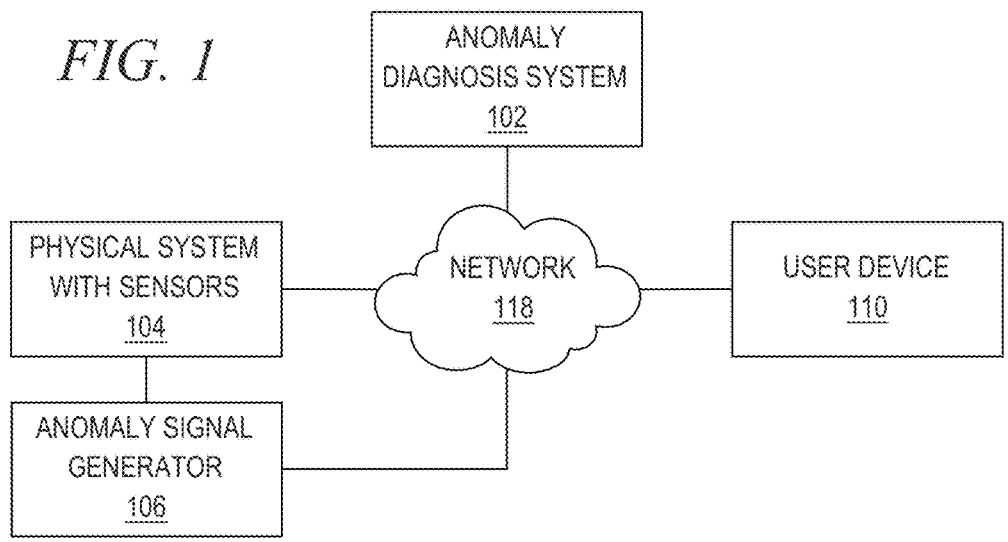
FIG. 1 illustrates an example networked computer system in which various embodiments may be practiced.

In the following description, for the purposes of explanation, numerous specific details are set forth in order to provide a thorough understanding of the example embodiments of the present invention. It will be apparent, however, that the illustrative embodiments may be practiced without these specific details. In other instances, well-known structures and devices are shown in block diagram form in order to avoid unnecessarily obscuring the example embodiments.

Embodiments are described in sections below according to the following outline:
  1. General Overview
  2. Example Computing Environment
  3. Example Computing Components
  4. Functional Descriptions
    4.1. Anomaly Signal Generation
    4.2. Metadata Labeling
    4.3. Anomaly Detection
    4.4. Anomaly Signal Identification
    4.5. Example Graphical User Interface Implementation 5. Example Processes
6. Hardware Implementation
7. Extensions and Alternatives

\*\*

1. General Overview

Physical systems generate large volumes of sensor data over time. Complex physical systems can include many assets, each having a plurality of components, a plurality of set points, and a plurality of sensor types. For example, a physical system can include a plurality of wind turbines, and each wind turbine can include components including a generator, a power system, etc. The set points can be about the desired yaw and pitch, the gear position, etc. The sensors can include electrical sensors, mechanical sensors, and environmental sensors, for example. The electrical sensors can include power sensors, voltage sensors, current sensors, etc.; the mechanical sensors can include acceleration sensors, velocity sensors, frequency sensors, etc.; and, the environmental sensors can include temperature sensors, pressure sensors, emission sensors, etc. As can be seen in this example, the large volume of sensor data can become overwhelming to users, thus making it difficult for users to detect and diagnose problems in the physical system by manually evaluating the sensor data. Thus, an automated anomaly detection and diagnosis system for diagnosing anomalous behavior in a physical system is disclosed.

Assets or components of the physical system can be in different states at a given time, including anomalous states. As described herein, an anomaly or anomalous state indicates that an asset or component is behaving in an unusual or unexpected manner. For example, a temperature sensor showing values that are rising more rapidly than is common or are outside a normal range can be an indication of anomalous behavior. As another example, a temperature sensor of a component can be showing values that are different from other temperature sensors of the component. Anomalous behavior can be indicative of a problem to be addressed within the physical system. In some embodiments, an anomaly signal generator generates anomaly signals for sensor signals such that values of each anomaly signal indicate a degree to which the corresponding sensor signal differs from a normal or expected value or trend of the sensor signal.

The anomaly diagnosis system is programmed to identify time intervals during which components of the physical system demonstrate anomalous behavior based on the generated anomaly signals. In one embodiment, the anomaly diagnosis system is programmed to apply a segmentation algorithm on anomaly signals and groups of anomaly signals to isolate time intervals (time segments) during which an anomaly signal value or score, for short, is high. For example, an anomaly score can be a mean anomaly value for the time segment. These time intervals represent time periods during which one or more sensors are behaving in an anomalous manner especially if the anomaly score fluctuates frequently. It would be difficult for a user to manually isolate these time intervals accurately and reliably merely by inspecting the sensor data.

The anomaly diagnosis system is programmed to identify sensor signals that contribute to anomalous behavior during each identified time interval. In some cases, an anomaly can occur when a single sensor behaves differently with respect to related signals. For example, the gearbox temperature sensor data for a given turbine may have values or a trend that are behaving differently from the generator temperature sensor data and oil temperature data from the same turbine. However, in other cases, an anomaly can manifest in multiple related sensors. For example, a problem occurring in a transformer can result in anomalous behavior in some or all of the transformer sensors (e.g., voltage_phase_t, voltage_phase_s, voltage_phase_r, frequency). The anomaly diagnosis system identifies anomaly signals that behave similarly at roughly the same time. In one embodiment, the anomaly diagnosis system applies a clustering algorithm to anomaly signals to identify groups of anomaly signals that have similar shapes in the identified time intervals. This results in groups of anomaly signals that show high anomaly scores at the same time, which is an indication that they are contributing to the same anomalous behavior.

The anomaly diagnosis system assigns metadata labels to the groups of anomaly signals that provide additional information to aid in diagnosis of the anomalous behavior. The metadata labels can be useful in determining a cause of the anomalous behavior. The anomaly diagnosis system considers each metadata label and determines a probability that the metadata label is associated with each group of anomaly signals. For example, the anomaly diagnosis system could determine a top asset label, a top component label, a top signal label, and a location label for each group of anomaly signals.

The anomaly diagnosis system generates an anomaly diagnosis graphical user interface (GUI) to present the anomaly groups, their associated anomaly scores, and metadata labels that are helpful for diagnosing anomalous behavior. For example, a representation of each anomaly group of sensor signals can include a duration of the corresponding anomaly, a number of sensor signals that contribute to the anomaly, and other information that can help the user to address anomalous behavior. The user can specify parameters for an anomaly diagnosis report. For instance, the user can request a weekly report on a subset of the assets in the physical system. The anomaly diagnosis system can then generate an anomaly diagnosis GUI that provides information for the signals corresponding to the specified subset of assets for the previous week.

In response to viewing the anomaly diagnosis GUI, the user can interact with the anomaly diagnosis system to investigate the anomalous behavior or to attempt to resolve an issue or problem being experienced in the physical system. For example, if the label is for a component of a particular asset, then the anomaly diagnosis system can send a request to that component to look up issues associated with that component based on other assigned labels.

2. Example Computing Environment

FIG. 1 illustrates an example networked computer system in which various embodiments may be practiced. FIG. 1 is shown in simplified, schematic format for purposes of illustrating a clear example and other embodiments may include more, fewer, or different elements. In some embodiments, the networked computer system comprises an anomaly diagnosis system 102, a physical system with sensors 104, and a user device 110, which are communicatively coupled through direct physical connections or via one or more networks 118.

In some embodiments, the anomaly diagnosis system 102 broadly represents one or more computers hosting virtual computing instances, and/or instances of an application that is programmed or configured with data structures and/or database records that are arranged to host or execute functions related to processing and analyzing anomaly data for sensor signal data produced by the physical system with sensors 104 to evaluate anomalous behavior of the physical system.

The anomaly diagnosis system 102 can be configured to further identify time periods of anomalous behavior, identify groups of sensor signals that contribute to anomalous behavior in the identified time periods, identify labels associated with the groups of sensor signals, and generate an anomaly diagnosis graphical user interface (GUI) to present information that assist in diagnosing anomalous behavior within the physical system 104. The anomaly diagnosis system 102 can comprise a server farm, a cloud computing platform, a parallel computer, a computer with one or more central processing units (CPUs) and one or more GPUs, or any other computing facility with sufficient computing power in data processing, data storage, and network communication for the above-described functions.

In some embodiments, the physical system with sensors 104 or the sensors alone can measure various attributes of the physical system in operation, such as temperature, pressure, noise, density, speed, position, or orientation. The physical system can have various assets, each having multiple components, and multiple sensors can measure the same attributes of different assets or components of the physical system. Typically, each sensor generates measurements at a particular frequency, forming a sensor signal of time series data. The set of all sensor signal values in a time interval represents the state of the physical system in that time interval. The physical system or at least one of the sensors can incorporate one or more processors capable of transmitting the sensor signal data to the anomaly diagnosis system 102 or another remote device or relaying commands from the anomaly diagnosis system 102 to control the operation of different components of the physical system.

In some embodiments, the user device 110 represents a user of the physical system with sensors 108 and/or a user of the anomaly diagnosis system 102. The user device 110 can present a graphical user interface to a user for presenting results of anomaly diagnosis. In one embodiment, the graphical user interface can allow the user to select groups of signals for anomaly diagnosis. The user device can also receive an instruction on how to diagnose or resolve a potential anomaly. Each of the one or more user devices 110 can comprise a desktop computer, laptop computer, tablet computer, smartphone, or wearable device. In certain embodiments, the anomaly diagnosis system 102 can be integrated into the physical system with sensors 108 or the user device 110.

The network 118 can be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, anomaly signal generator 106 generates anomaly signals for the sensor signals of the physical system 104. The values of each anomaly signal represent a degree to which the corresponding sensor signal differs from normal or expected values. In one embodiment, the anomaly signal generator 106 predicts a value for a given sensor signal for each time period and compares the actual value of the given sensor signal to the predicted value to generate an anomaly value. In an example embodiment, the anomaly signal generator 106 predicts the value of a sensor signal based on a set of related signals.

In some embodiments, the anomaly diagnosis system 102 is programmed to receive anomaly signals from anomaly signal generator 106 continuously in real time. The anomaly diagnosis system 102 is programmed to identify time intervals during which anomalies may be occurring based on the anomaly signals. The anomaly diagnosis system 102 is programmed to identify groups of anomaly signals having similar shapes within the identified time intervals. The anomaly diagnosis system 102 is programmed to generate anomaly scores for the groups of anomaly signals and assigns metadata labels to the groups of anomaly signals. The anomaly diagnosis system 102 is programmed to generate an anomaly diagnosis graphical user interface (GUI) to present reports of anomaly data that correlates the groups of anomaly signals with the physical so concrete actions can be performed. The anomaly diagnosis system 102 can be programmed to take corrective actions in response to identifying anomalies of interest, such as by sending a report of a potential anomaly to the user device 110 or by sending a command to the physical system with sensors 104 to alter the operation of the physical system.

3. Example Computing Components

Figure 2:
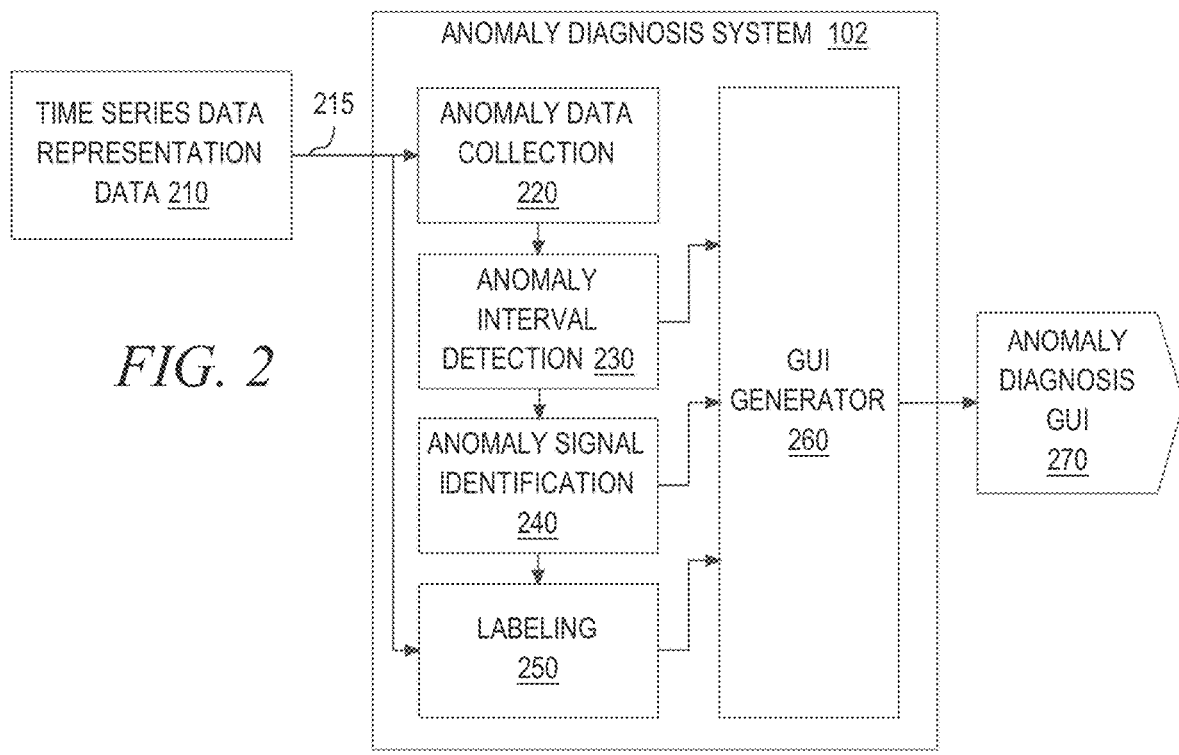
FIG. 2 is a diagram illustrating example functional components of a system for diagnosing anomalous behavior in a physical system in accordance with an illustrative embodiment.

FIG. 2 is a diagram illustrating example functional components of a system for diagnosing anomalous behavior in a physical system in accordance with an illustrative embodiment. FIG. 2 is an expanded diagram of components within anomaly diagnosis system 102 shown in FIG. 1. In an embodiment, anomaly diagnosis system 102 contains sets of instructions, services, or modules, which when executed by one or more processors perform various functions related to collecting time series data for sensors of in a physical system, processing the time series data to diagnose anomalies in the time series data, and generating a graphical user interface for presenting anomalies with information for diagnosing causes for the anomalies. In FIG. 2, the anomaly diagnosis system 102 is configured with an anomaly data collection service 220, an anomaly interval detection service 230, an anomaly signal identification service 240, a labeling service and a graphical user interface (GUI) generator service 260. The anomaly diagnosis system 102 depicted in FIG. 2 represents just one illustrative example of the troubleshooting system 102 and is not intended to be limited to having only the services depicted in FIG. 2. For instance, the anomaly diagnosis system 102 can include fewer or additional services and modules not currently shown in FIG. 2.

4. Functional Descriptions 4.1. Anomaly Signal Generation

In some embodiments, the anomaly data collection service 220 represents a service for collecting, processing, and storing anomaly signals corresponding to time series representation data 210 for sensors of the physical system. In one embodiment, the time series representation data 210 comprises embeddings that represent the raw sensor signals generated by sensors of the physical system. Each sensor of the physical system can produce an analog signal that is measured and encoded into a digital signal that is processed to generate time series representation data 210. Each stream of time series representation data 210 generally corresponds to one sensor signal over a time range and may comprise one or more feature vectors referred to herein as "embeddings." Operational data generally refers to actual or raw data generated by a machine, device, or equipment during operation of the machine, device, or equipment and can include predicted data generated by one or more machine learning (ML) prediction models in some embodiments. Time series representation data 210 can be numerical or categorical. Example numerical time series representation data can relate to temperature, pressure, speed, frequency, etc. generated by a machine, device, or equipment within the physical system, or confidence scores of state predictions made by a ML prediction model. Example categorical operational data has a fixed set of values, such as different states of a machine, device, or equipment, or state predictions made by a prediction model.

As stated above, the time series representation data 210 can take the form of embeddings, each of which is a concise representation of a tile or slice, which in turn provides aggregate measures, such as minimums, maximums, means, standard deviations, and variances, at a certain time resolution and represents a portion of operational data corresponding to a duration of time covered in that tile or slice. In some embodiments, time series representation data 210 can include embeddings at different time resolutions or scales. For example, the time series representation data 210 can include embeddings for second durations of time and embeddings for minute durations of time. Each embedding at the second resolution represents the time series data measures for a respective second duration. Each embedding at the hour resolution represents the time series data for a respective hour duration.

Additional details regarding generation of tiles and slices, as well as encoding of tiles and slices to form embeddings, can be found in U.S. patent application Ser. No. 17/493,800, the contents of which are incorporated by reference in their entirety as if fully disclosed herein.

Figure 3:
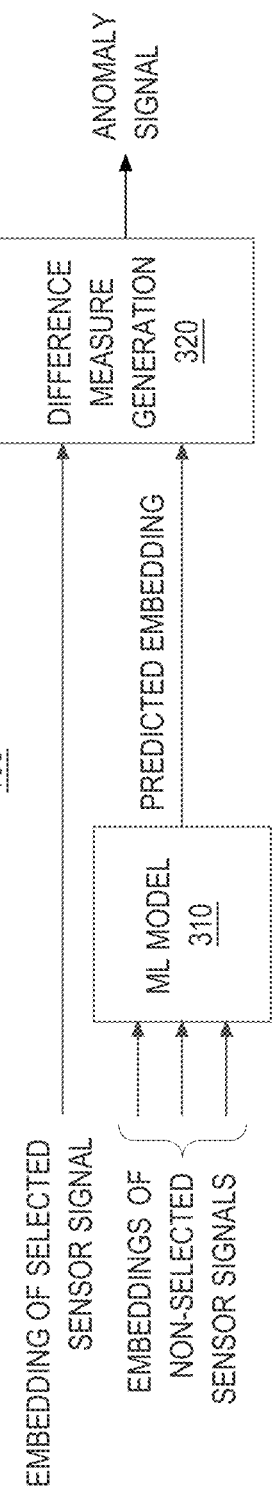
FIG. 3 illustrates an anomaly signal generator in accordance with an illustrative embodiment.

In some embodiments, the anomaly data collection service 220 obtains an anomaly signal for each sensor signal generated by the sensors of the physical system. In one embodiment, the anomaly signals are generated by the anomaly data collection service 220 based on the time series representation data 210. FIG. 3 illustrates an anomaly signal generator 106 in accordance with an illustrative embodiment. The anomaly signal generator 106 receives a set of embeddings corresponding to a set of sensor signals at a particular point in time. In one embodiment, the set of embeddings are related to each other. For example, the set of embeddings can correspond to a given asset or component within the physical system.

The set of embeddings include an embedding for a selected sensor signal and other embeddings for non-selected sensor signals. An ML model 310 is trained to predict an embedding for the selected sensor signal using the other embeddings as inputs, where the ML model 310 is trained based on a training dataset corresponding to normal states of the physical system. In an alternative embodiment, the input to the ML model 310 could include data from non-selected sensor signals and/or historical data from the selected sensor signal. A difference measure generation component 320 determines a difference measure representing a degree to which the actual embedding for the selected sensor signal deviates from the predicted embedding for the selected sensor signal. In one embodiment, the difference measure generation component 320 uses subtraction to determine the difference measure, as follows:

anomaly signal=|actual/embedding—predicted embedding|.

Alternatively, other techniques can be used for generating a difference measure for the selected sensor signal, particularly techniques that consider multiple attributes of each selected or non-selected sensor signal. The difference measure generation component 320 outputs the difference measure as an anomaly signal for each selected sensor signal.

In one embodiment, the anomaly signal generator 106 can generate a different anomaly signal for each selected sensor signal within the set of sensor signals. In this example embodiment, there can be an anomaly signal generator 106 for each set of sensor signals, where each sensor signal within the set of sensor signals can be selected alternatively to generate respective anomaly signals. In an alternative embodiment, there can be a different anomaly signal generator corresponding to each sensor signal, where the sensor signal for which the anomaly signal is being generated is always selected.

Anomaly signal generation is described in further detail in U.S. patent application Ser. No. 17/956,827, the contents of which are incorporated by reference in their entirety as if fully disclosed herein.

Anomaly signals could be generated using other techniques. For example, the anomaly score for each sensor signal could be determined from only historical values of the sensor signal. The distribution of the sensor signal values could be determined, and the anomaly score could represent a difference from the mean of this distribution or from the range of the mean plus or minus three standard deviations of this distribution. Alternatively, a distribution of sensor signal values could be computed from only sensor signal values corresponding to normal states of the physical system. Other techniques known to someone skilled in the art could be used.

In one embodiment, the difference measure generation component 320 normalizes each anomaly signal such that the amplitude of the anomaly signal represents a difference between the embedding and an expected embedding relative to an amount of variation in the signal. For example, the difference measure generation component 320 normalizes each anomaly signal by dividing the difference between the actual embedding and the predicted embedding by a standard deviation of the signal. A result of such a normalization is an anomaly signal that represents a difference between the actual embedding and an expected embedding as a number of standard deviations.

In one embodiment, the anomaly signal generator 106 can be embodied within the anomaly data collection service 220, and the anomaly data collection service 220 can generate an anomaly signal from embeddings in the time series representation data 210. In another embodiment, the anomaly signal generator 106 can be a separate component, as shown in FIG. 1.

Figure 4:
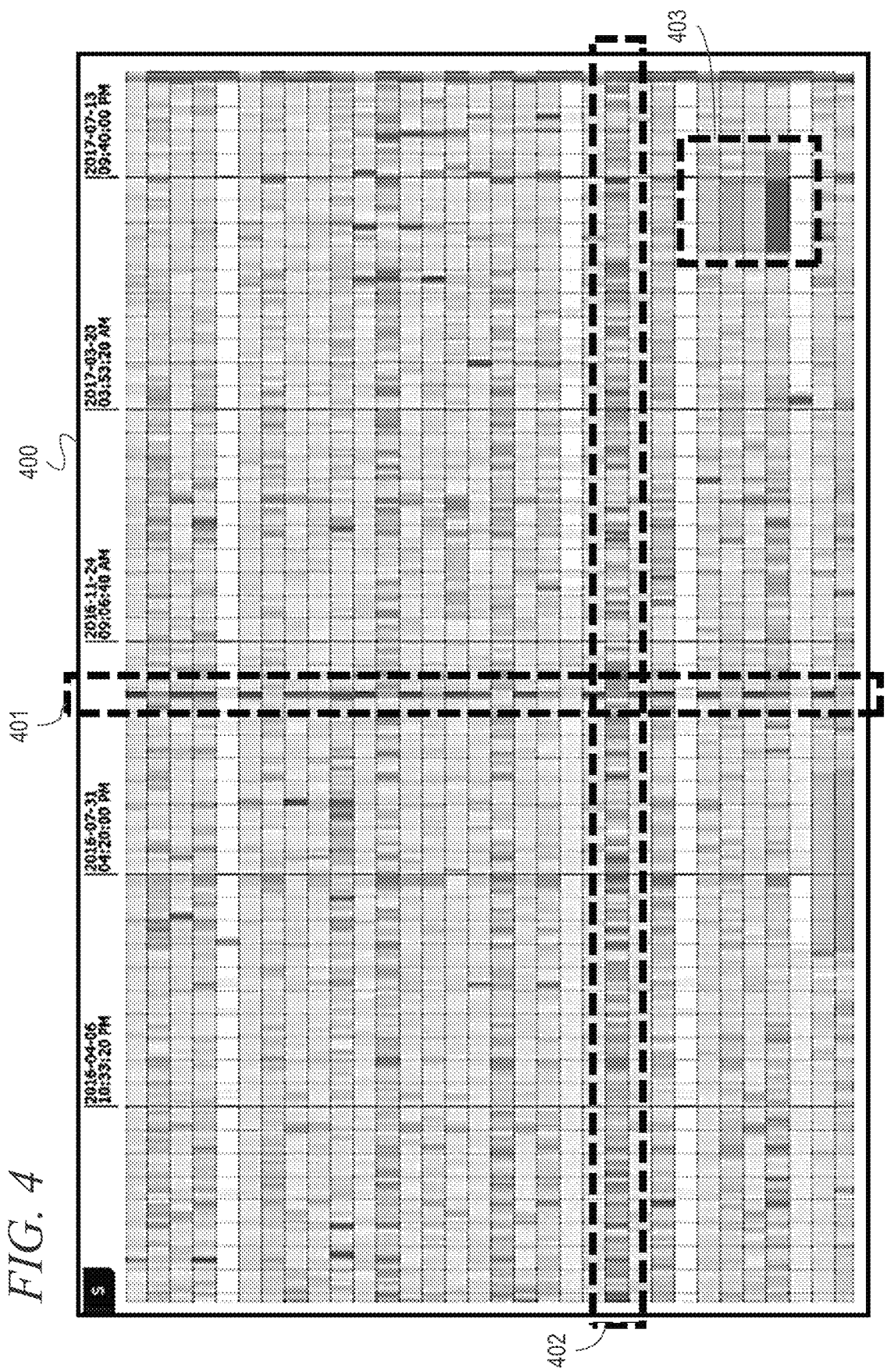
FIG. 4 illustrates a heatmap of anomaly signals corresponding to time series in accordance with an illustrative embodiment.

FIG. 4 illustrates a heat map 400 of anomaly signals corresponding to time series in accordance with an illustrative embodiment. The anomaly heat map 400 is a data visualization that shows a magnitude of each anomaly signal as a color, or grayscale in the depicted example, thus giving a visual cue to the viewer about how the anomaly signal varies over time. In the example shown in FIG. 4, a higher anomaly signal is represented as a darker gray color. Each row of anomaly heat map 400 represents an anomaly signal over time (from left to right). The anomaly signals can be organized such that related signals are presented in adjacent rows. For example, the first five rows in anomaly heat map 400 can represent anomaly signals corresponding to temperature signals (e.g., ambient, gearbox, generator, oil, transformer) for a particular wind turbine. In embodiments of our anomaly detection system, the organization of anomaly signals for analysis and display is performed automatically in order to address the vast scale of available data.

FIG. 4 illustrates a heat map 400 of anomaly signals that visually demonstrate anomalies 401, 402, 403 in sensor signals in accordance with an illustrative embodiment. A viewer of the anomaly heat map 400 may identify obvious visual cues that indicate an anomaly may be occurring in the anomaly data. For example, the anomaly signals at time 401 may represent a systemic temperature anomaly that affects all turbines in the time series data. As another example, anomaly signal 402 may represent one gearbox that consistently behaves in an unpredictable way temperature-wise. As yet another example, the group of anomaly signals 403 may represent a notable temperature disturbance in one particular turbine during a period of time.

While the anomaly heat map 400 is a useful data visualization for a viewer to identify where anomalies may be occurring or may have occurred, the anomaly heat map 400 does not by itself diagnose anomalies. The anomaly heat map 400 can be presented in a graphical user interface to provide the data visualization to a user to provide context for one or more anomalies of interest and to assist in diagnosing anomalies.

4.2. Metadata Labeling

In some embodiments, the labeling service 250 represents a service for applying metadata labels to time series representation data 210 for sensor signals and to anomaly signals corresponding to the time series representation data 210. In one embodiment, the labeling service 250 uses signal trees representing all sensor signals to assign labels to the time series representation data 210 and to the anomaly signals to facilitate understanding of the time series representation data 210 and the anomaly signals and enable further diagnosis of the anomaly and generation of remedies for the anomaly. The depicted examples show assets that include wind turbines and components and signal types associated with wind turbines; however, the assets, components, and signal types can vary depending on the physical system being monitored. Furthermore, more or fewer trees can be used depending on the implementation. Also, the trees can be modified to include more or fewer levels of the hierarchy in the trees.

Figure 5A:
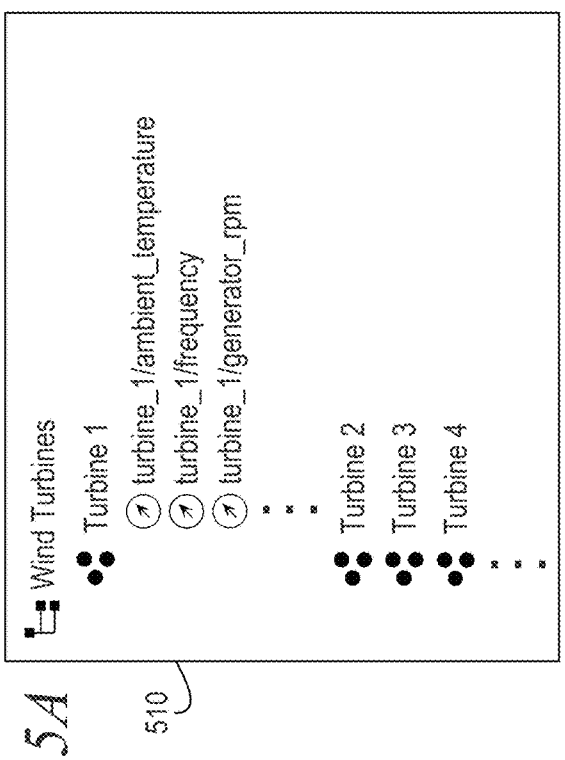
FIG. 5A illustrates an asset tree of metadata labels applicable to sensor signals in accordance with an example embodiment.

FIG. 5A illustrates an asset tree 510 for applying metadata labels to sensor signals in accordance with an example embodiment. In the depicted example, asset tree 510 includes a root node of "Wind Turbines," which has a child node for each wind turbine in the physical system. Each child node is associated with its asset label, such as "Turbine 1," "Turbine 2," "Turbine 3," "Turbine 4," etc. Thus, each sensor signal under a given node inherits the associated asset label.

In the example shown in FIG. 5A, each asset node, such as the "Turbine 1" node, has a child node for each sensor signal of that asset. The asset node with the asset label of "Turbine 1" has sensor signals including "turbine_1/ambient_temperature," "turbine_1/frequency," "turbine_1/generator_rpm," etc. These sensor signals can be assigned a label indicating the signal name and a label for each node above the sensor signal in the asset tree. In addition, an anomaly signal corresponding to a sensor signal can be assigned the same labels as the corresponding sensor signal.

Figure 5B:
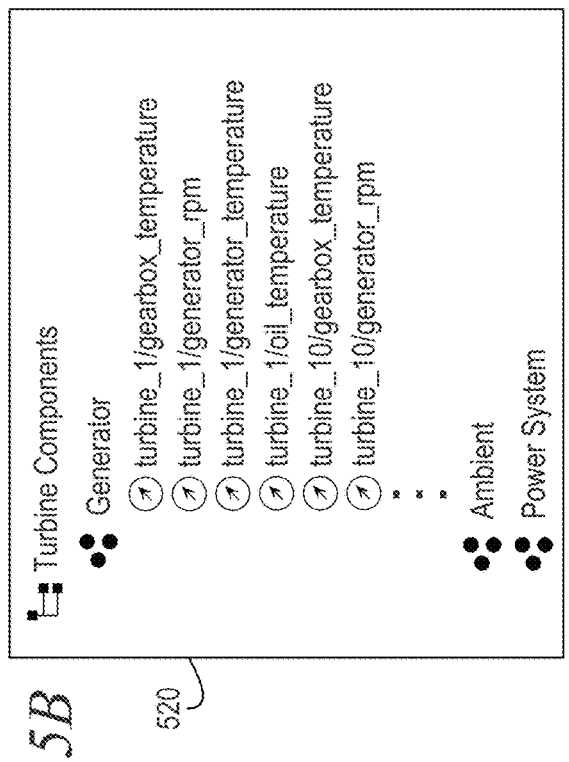
FIG. 5B illustrates a component tree of metadata labels applicable to sensor signals in accordance with an example embodiment.

FIG. 5B illustrates a component tree 520 for applying metadata labels to sensor signals in accordance with an example embodiment. In the depicted example, component tree 520 includes a root node of "Turbine Components," which has a child node for each wind turbine component in the physical system. Each child node is associated with its component label, such as "Generator," "Ambient," "Power System," etc. Thus, each sensor signal under a given node inherits the associated component label.

In the example shown in FIG. 5B, each component node, such as the "Generator" node, has a child node for each sensor signal of that component. The component node with the component label of "Generator" has sensor signals including "turbine_1/gearbox_temperature," "turbine_1/generator_rpm," "turbine_1/generator_temperature," "turbine_1/oil_temperature," "turbine_10/gearbox_temperature," "turbine_10/generator_rpm," etc. These sensor signals can be assigned a label indicating the signal name and a label for each node above the sensor signal in the component tree.

Figure 5C:
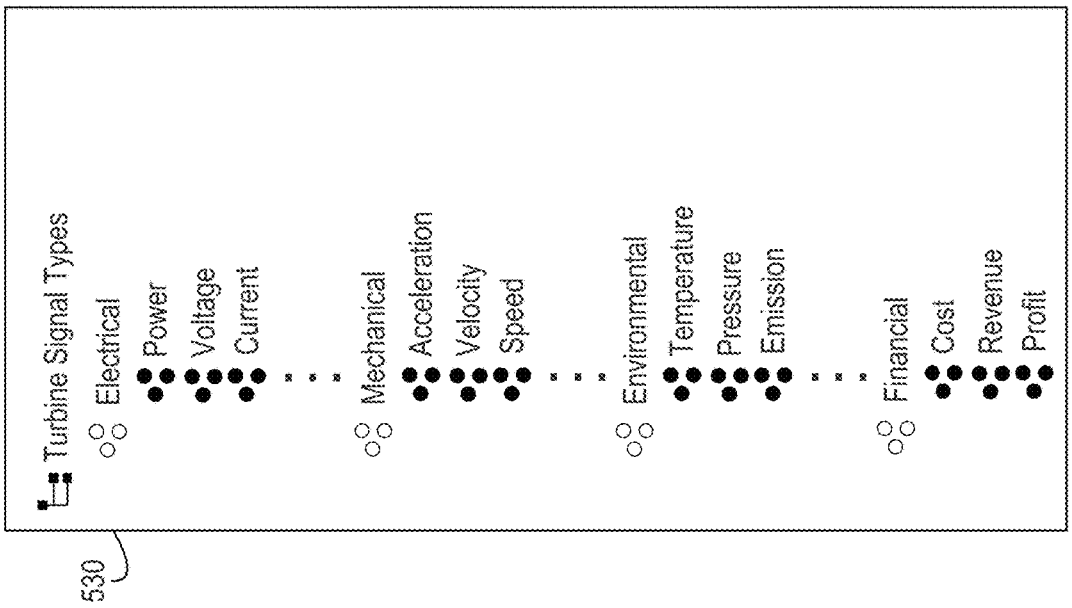
FIG. 5C illustrates a signal type tree of metadata labels applicable to sensor signals in accordance with an example embodiment.

FIG. 5C illustrates a signal type tree 530 for applying metadata labels to sensor signals in accordance with an example embodiment. In the depicted example, signal type tree 530 includes a root node of "Turbine Signal Types," which has a child node for each signal type category in the physical system. Each child node is associated with its signal type category label, such as "Electrical," "Mechanical," "Environmental," "Financial," etc. Thus, each sensor signal under a given signal type category node inherits the associated signal type category label.

Furthermore, each signal type category node has a child node for each signal type in the physical system. Each signal type node is associated with its signal type label. The "Electrical" signal type category node has child nodes corresponding to "Power," "Voltage," "Current," etc. The "Mechanical" signal type category node has child nodes corresponding to "Acceleration," "Velocity," "Speed," etc. The "Environmental" signal type category node has child nodes corresponding to "Temperature," "Pressure," "Emission," etc. The "Financial" signal type category node has child nodes corresponding to "Cost," "Revenue," "Profit," etc. Each sensor signal under a given signal type node inherits the associated signal type label. Thus, as an example, the sensor signal named "turbine_1/generator_rpm" may be under the "Turbine 1" node in the asset tree 510, under the "Generator" node in the component tree 520, under the "Mechanical" node and a "Frequency" node in the signal type tree 530 and can be assigned "Turbine 1," "Generator," "Mechanical," and "Frequency" labels.

In one embodiment, the asset tree 510, the component tree 520, and the signal type tree 530 can be incorporated into a graphical user interface to allow user selection to filter sensor signals and anomaly signals. For example, a user may wish to view anomaly diagnosis information for only a selected wind turbine or for only a selected signal type. More specifically, a user may view the anomaly heat map 400, identify a particular wind turbine that may be showing an anomaly, and filter the anomaly diagnosis information to the particular wind turbine.

The labeling service 250 can assign labels to the sensor signals and anomaly signals based on the asset tree 510, the component tree 520, and the signal type tree 530. In some embodiments, the labeling service 250 obtains metadata labels from other sources. For instance, the labeling service 250 may obtain geographic location data associated with the assets and their associated sensor signals. The labels assigned to the sensor signals and the anomaly signals can be used for anomaly diagnosis, as will be described in further detail below.

4.3. Anomaly Detection

In some embodiments, signals will be processed for interval detection according to a processing pipeline. Signals are first selected, then segmented into candidate intervals, which are then filtered by aggregate scores, then signals within each interval are clustered for relevance, then finally the segmented and clustered signals are scored and tagged for reporting.

4.3.1. Anomaly Signal Selection

In some embodiments, the anomaly interval detection service 230 applies the time series segmentation algorithm to groups of anomaly signals, or to all available signals. For example, as described above, a user may select a node of a tree in a graphical user interface to filter sensor signals by asset, component, or signal type. For instance, a user may select all temperature signals in Turbine 1, and the anomaly interval detection service 230 segments the group of anomaly signals corresponding to the temperature signals in Turbine 1 to identify time segments having a high aggregate anomaly score for that group. Signal group selection could also be made analytically in some embodiments, or by other criteria.

4.3.2. Anomaly Interval Detection

In some embodiments, the anomaly interval detection service 230 represents a service for segmenting anomaly signals to identify intervals of time during which an anomaly may be occurring or may have occurred. Time series segmentation is a method of time-series analysis in which an input time-series is divided into a sequence of discrete segments to reveal the underlying properties of its source. Time-series segmentation is useful for dividing a source signal into regions where the signal can be considered constant, but with noise. The boundaries of the regions and the value of the signal within each region are not known a priori. Algorithms based on change-point detection include sliding windows, bottom-up, and top-down methods. Probabilistic methods based on hidden Markov models have also proved useful in solving this problem; however, these are only examples for illustration, and the illustrative embodiments may be practiced without these or other examples of time series segmentation algorithms. The anomaly interval detection service 230 applies a time series segmentation algorithm to each anomaly signal and to groups of anomaly signals to generate segmented anomaly signals, each having a plurality of time segments such that each time segment represents a change in the anomaly signal or group of anomaly signals relative to a previous time segment.

Figure 6:
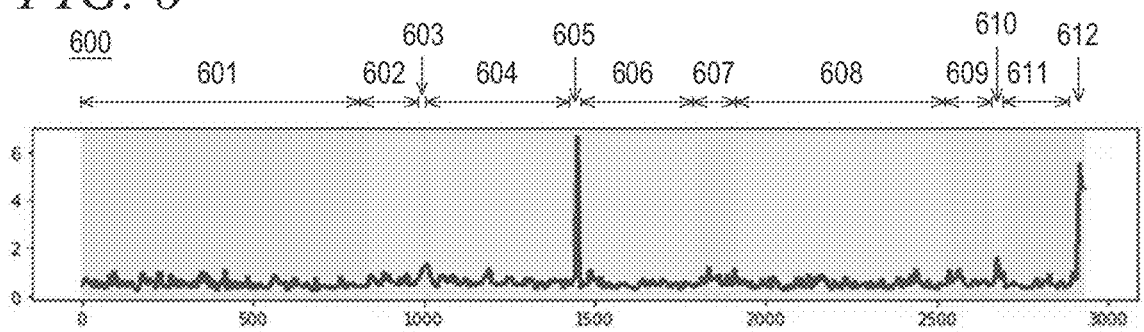
FIG. 6 illustrates a segmented anomaly signal in accordance with an example embodiment.

In one embodiment, the anomaly interval detection service 230 applies the time series segmentation algorithm to the anomaly signals individually. FIG. 6 illustrates a segmented anomaly signal 600 in accordance with an example embodiment. The anomaly signal 600 is divided into a plurality of time segments 601-612, each representing a period of time during which the anomaly signal is different from the previous and succeeding time segments. In some embodiments, the anomaly interval detection service 230 ranks the time segments 601-612 by anomaly score. In one embodiment, the anomaly interval detection service 230 determines an anomaly score for a given time segment by determining a mean anomaly signal value for the given time segment. In an alternative embodiment, the anomaly interval detection service 230 determines a maximum anomaly signal value for a given time segment as the anomaly score for the given time segment. In the example shown in FIG. 6, time segment 605 may have a highest anomaly score, and time segment 612 may have a second highest anomaly score.

In one embodiment, the anomaly interval detection service 230 applies the time series segmentation algorithm to individual anomaly signals and to various groups of anomaly signals and compares the results to identify which provides the highest anomaly score or aggregate anomaly score. For example, a time segment from an individual anomaly signal corresponding to oil temperature in Turbine 1 may have a higher anomaly score than an overlapping time segment from the group of anomaly signals corresponding to all temperature signals in Turbine 1, or vice versa. The anomaly interval detection service 230 can try different combinations of groups of signals to identify time periods (time segments) that indicate an anomaly may be occurring and select the time periods of interest that provide the highest anomaly score or aggregate anomaly score. Aggregation of scores for groups and segments of signals may also be performed in different ways in different embodiments.

4.3.3. Anomaly Interval Scoring

In one embodiment, the anomaly interval detection service 230 computes an anomaly score for each time segment having an aggregated score above a configured threshold and ranks the time segments by anomaly score. The anomaly interval detection service 230 can identify the top-ranking time segments as the anomaly time interval. In one embodiment, if multiple top-ranking time segments are consecutive, then the anomaly interval detection service 230 can combine the multiple top-ranking time segments into the anomaly time interval.

4.3.4. Anomaly Signal Identification

In some embodiments, the anomaly signal identification service 240 represents a service for clustering the anomaly signals to identify groups of anomaly signals that behave in a similar way during select time intervals, as described above. Cluster analysis or clustering is the task of grouping a set of objects in such a way that objects in the same group (cluster) are more similar in some sense to each other than to those in other groups. Popular notions of clusters include groups with small distances between cluster members, or dense areas of the data space, intervals, or particular statistical distributions. Clustering can therefore be formulated as a multi-objective optimization problem. The appropriate clustering algorithm and parameter settings (including parameters such as the distance function to use, a density threshold or the number of expected clusters) depend on the individual data set and intended use of the results. As a specific example, k-means clustering is a method of vector quantization that aims to partition n observations into k clusters in which each observation belongs to the cluster with the nearest mean (cluster centers or cluster centroid), serving as a prototype of the cluster.

In one embodiment, the anomaly signal identification service 240 applies a clustering algorithm on the anomaly signals prior to segmentation to identify anomaly signals that have similar shapes and thus are potentially more synchronized in terms of anomaly response. The anomaly signal identification service 240 groups signals based on properties of the anomaly values. In one embodiment, the shapes of anomaly values with respect to time could be used to cluster the signals within each time segment into groups. The anomaly signal identification service 240 identifies a cluster of anomaly signals that have a high similarity to the anomaly signal or multiple anomaly signals used to identify the anomaly time interval.

Figure 7:
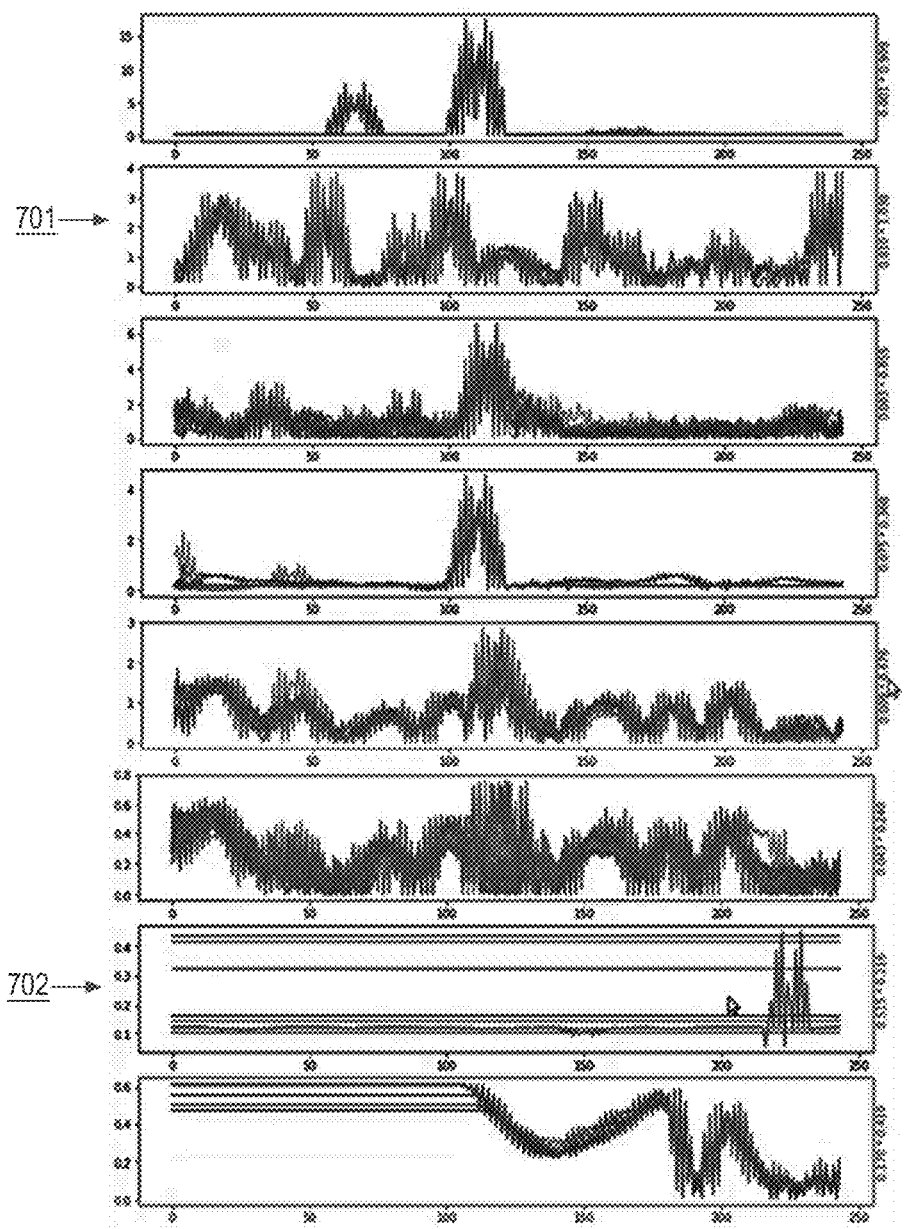
FIG. 7 illustrates examples of groups of anomaly signals that are clustered by the shapes of the signals in accordance with an example embodiment.

FIG. 7 illustrates examples of groups of anomaly signals that are clustered by the shapes of the signals in accordance with an example embodiment. The examples shown in FIG. 7 include groups that cluster together, indicating that the groups of sensor signals contribute to common anomalies. For example, anomaly group 701 is highly correlated; therefore, there is a high confidence that the sensor signals in this group, which correspond to the anomaly signals in the anomaly group 701, contribute to an anomaly. On the other hand, anomaly group 702 is not as highly correlated; therefore, there is a lower confidence that the sensor signals associated with anomaly group 702 contribute to an anomaly.

4.3.5. Anomaly Cluster Scoring

Similar to way that signal scores are aggregated for detected time segments, each cluster is also given an aggregate score for the time segment and clustered signals. Clusters of signals can then be ranked within a detected time segment in some embodiments. Scores of significant clusters within a time segment may also be used in aggregate to determine a revised anomaly score for the entire time segment, using the clustering information to refine the previous aggregated score for the time segment.

4.3.6 Anomaly Labels and Scoring

In some embodiments, the anomaly diagnosis system 102 identifies metadata labels associated with each anomaly group of anomaly signals and their corresponding sensor signals. Probability of occurrence of metadata labels within individual anomaly clusters, within signals in detected time segments for anomaly intervals, and within the whole corpus of signals may be used to score the importance of each metadata label for a given anomaly. For example, in one embodiment the label "Turbine 19" can have a background probability of 1.37%, meaning the label appears in 1.37% of the sensor signals being analyzed, and an anomaly interval probability of 14.29%, meaning the label appears in 14.29% of the sensor signals in a given detected anomaly signal group. Comparing these two probabilities can yield important information about the relevance of the metadata label to the detected anomaly.

4.3.7. Anomaly Diagnosis and Reporting

The anomaly diagnosis system 102 can then select a top asset label, a top component label, and a signal type label for each anomaly group. In one embodiment, the anomaly diagnosis system 102 ranks all labels of the same type by label score and selects the label with the highest label score to associate with the anomaly group. For example, the anomaly diagnosis system 102 can select a top asset label, a top component label, and a top signal type label for each anomaly group. These metadata labels can be useful to the user when diagnosing anomalies. For instance, these metadata labels can indicate that an anomaly is occurring in a particular asset (e.g., Turbine 9), is occurring in a particular component (e.g., Controller), or involves a particular type of sensor signal (e.g., ambient temperature).

In some embodiments, other techniques can be used to identify sensor signals that may have contributed to an anomaly that may have occurred in a select time interval. For example, the anomaly scores of the sensor signals can be simply ranked, and the group of sensor signals that have higher anomaly scores may be more likely to have contributed to the anomaly.

4.4. Example Graphical User Interface Implementation

In some embodiments, the graphical user interface (GUI) generator service 260 represents a service for generating anomaly diagnosis GUI 270. The GUI generator service 260 generates GUI elements that presents graphical representations of sensor signal data, graphical representations of anomaly signal data, metadata label trees for navigation, graphical representations of anomaly groups, graphical representations of signal value distribution data, and interactive controls for anomaly diagnosis.

Figure 8:
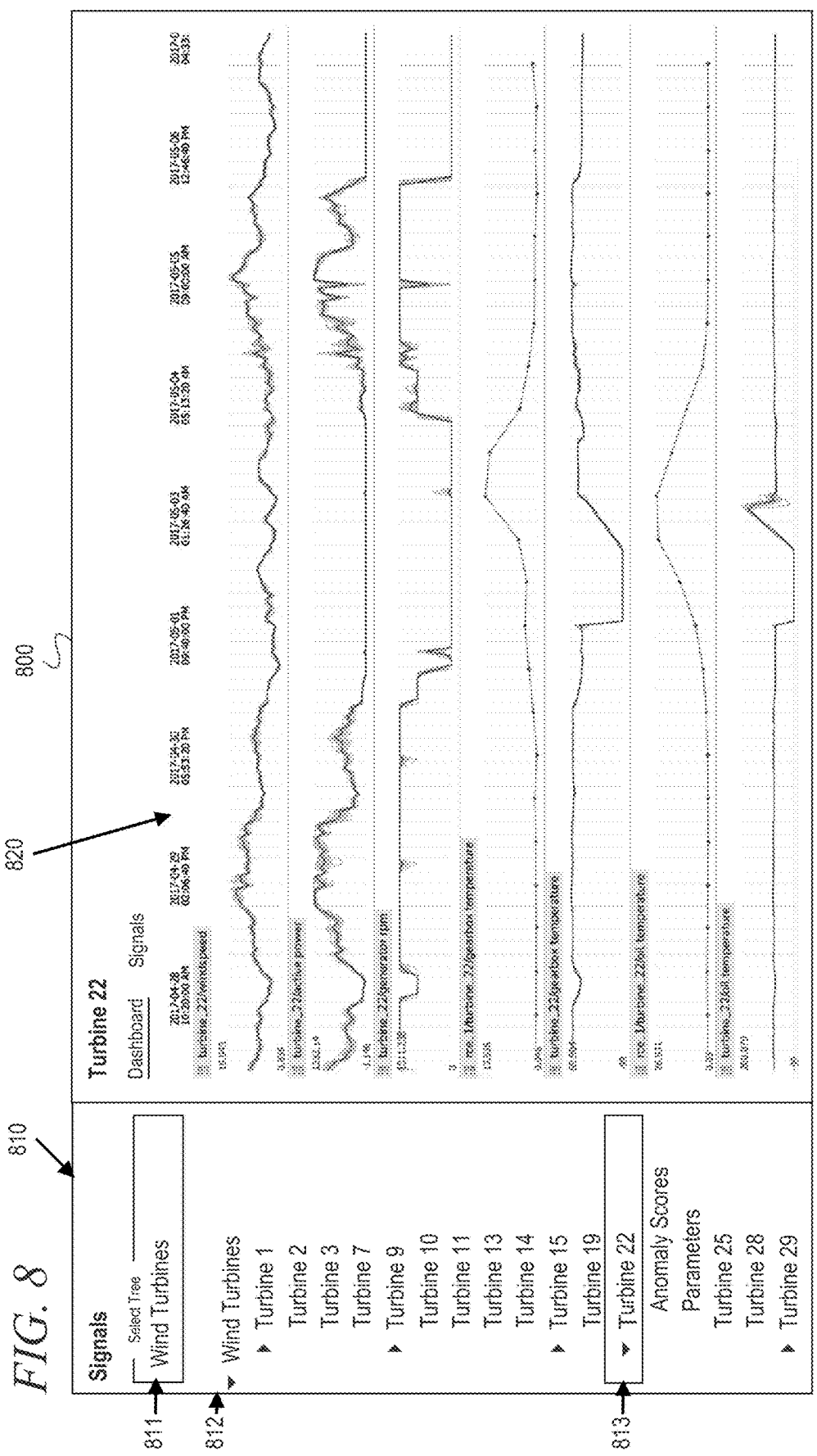
FIG. 8 is an example screen of an anomaly diagnosis graphical user interface (GUI) with a tree of metadata labels for navigation in accordance with an illustrative embodiment.

FIG. 8 is an example screen of an anomaly diagnosis graphical user interface (GUI) with a tree of metadata labels for navigation in accordance with an illustrative embodiment. The anomaly diagnosis GUI 800 includes a first display panel 810 presenting a tree of metadata labels 812. In the depicted example, the tree of metadata labels 812 is an asset tree including wind turbines. The first display panel 810 includes a tree selection control 811, and the user has selected the asset tree. In one embodiment, the tree selection control 811 is a drop-down box; however, the tree selection control 811 can be another type of GUI control, such as radio buttons.

In the example shown in FIG. 8, the user has selected "Turbine 22" 813 in the tree of metadata labels. The anomaly diagnosis GUI 800 includes a second display panel 820 presenting graphical representations of sensor signals having the "Turbine 22" metadata label. In other embodiments, the second display panel 820 can present other information associated with "Turbine 22" 813, such as an anomaly heat map for the same set of sensor signals and the same time period or a list of predicted anomalies involving "Turbine 22".

FIG. 9A is an example screen of an anomaly diagnosis GUI showing anomaly groups with associated metadata labels in accordance with an illustrative embodiment. The anomaly diagnosis GUI 900 presents graphical representations of anomaly groups corresponding to anomalies of interest. As described above, the anomaly diagnosis system 102 determines that a sensor signal indicates an anomaly in the physical system if its corresponding anomaly signal has an anomaly value or score that is greater than a predetermined threshold (e.g., three standard deviations). The anomaly diagnosis system 102 performs segmentation and clustering to determine an anomaly group of sensor signals that behave in a similar manner during a detected time interval associated with a high anomaly score.

The screen illustrated in FIG. 9A could be presented in response to a selection of a node in a signal tree, for example, as the list of anomalies related to the entity represented by the selected node. As shown in FIG. 9A, each anomaly group is presented as a graphical representation including an aggregate anomaly score 901, a start time, a top asset, a top component, a top signal, a duration, a number of total signals contributing to the anomaly, and a selection control 902 for viewing details of the anomaly group, as further discussed below. As discussed above, the "TOP" columns, such as the top asset and top component, specify the labels that occur most frequently within the anomaly group and help identify where and why the anomaly has occurred. Indicating labels associated with non-leaf nodes not only helps narrow down where the anomaly may have occurred but also enables comparative analysis between nodes under the same parent node.

The top signal is the sensor signal associated with the anomaly signal having the highest anomaly score in the anomaly group. For example, if the anomaly interval detection service 230 segments the anomaly signals individually, then the top signal is likely associated with the anomaly signal having an anomaly score greater than the threshold, leading to detection of a time window during which an anomaly is occurring or may have occurred. The other anomaly signals in the anomaly group may be the anomaly signals that behave similarly to the anomaly signal associated with the top signal. As another example, if the anomaly interval detection service 230 segments a group of anomaly signals, then the top signal is the sensor signal associated with the anomaly signal in the anomaly group having the highest anomaly score in the detected time interval.

In an alternative embodiment, the anomaly groups can be sorted by aggregate anomaly score 901. Each item listed under "Top Signal", such as "ambient temperature", could also be selectable, and a selection could trigger a presentation of a screen illustrated in FIG. 10, for example, as further discussed below.

Figure 9B:
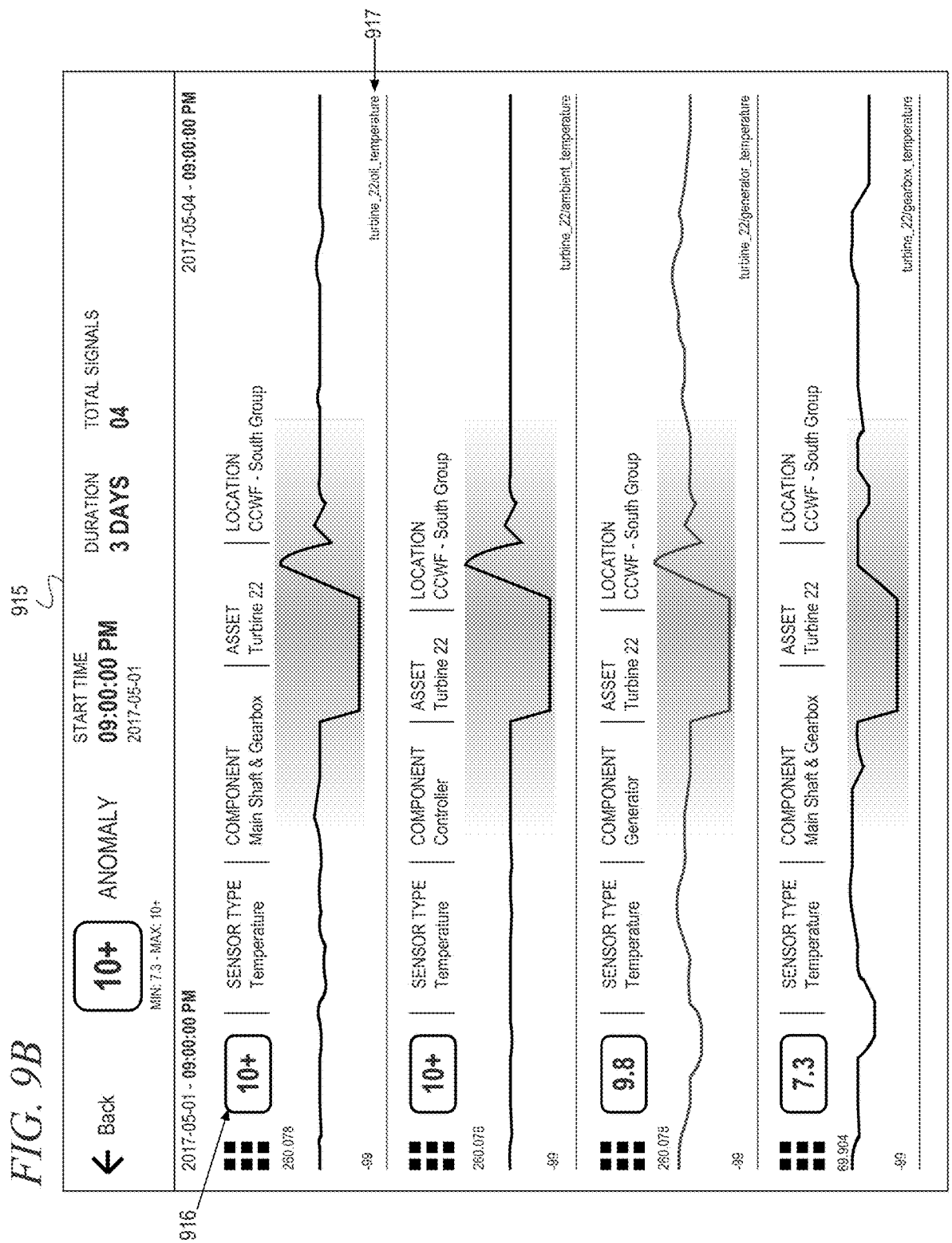
FIG. 9B is an example screen of an anomaly diagnosis GUI showing a detailed view for a selected anomaly group with metadata labels in accordance with an illustrative embodiment.

FIG. 9B is an example screen of an anomaly diagnosis GUI showing a detailed view for a selected anomaly group with metadata labels in accordance with an illustrative embodiment. In response to a selection of button 902, for example, the anomaly diagnosis GUI 915 presents a detailed view of anomaly group 910. The anomaly diagnosis GUI 915 shows a graphical representation of each sensor signal in the anomaly group. The graphical representation of each sensor signal includes an anomaly score 916 associated with the sensor signal and other information associated with the sensor signal, such as a sensor type, a component label, an asset label, a location label, and a sensor signal name 917.

As shown in FIG. 9B, the top signal is "turbine_22/oil_temperature," which has a highest anomaly score 916. The other signals in anomaly diagnosis GUI 915 ("turbine_22/ambient_temperature," "turbine_22/generator_temperature," and "turbine_22/gearbox_temperature") are associated with anomaly signals that behave in a similar manner to the anomaly signal associated with "turbine_22/oil_temperature." Furthermore, the top asset shown in FIG. 9A is "Turbine 22," and all the signals in the anomaly group shown in FIG. 9B are from Turbine 22. Still further, the top component shown in FIG. 9A is "Main Shaft & Gearbox," and two of the four sensor signals shown in FIG. 9B are from the "Main Shaft & Gearbox" component. In addition, all the sensor signals shown in the anomaly diagnosis GUI 915 are assigned a location label of "CCWF—South Group," which can be useful to the user when diagnosing anomalous behavior.

Figure 9C:
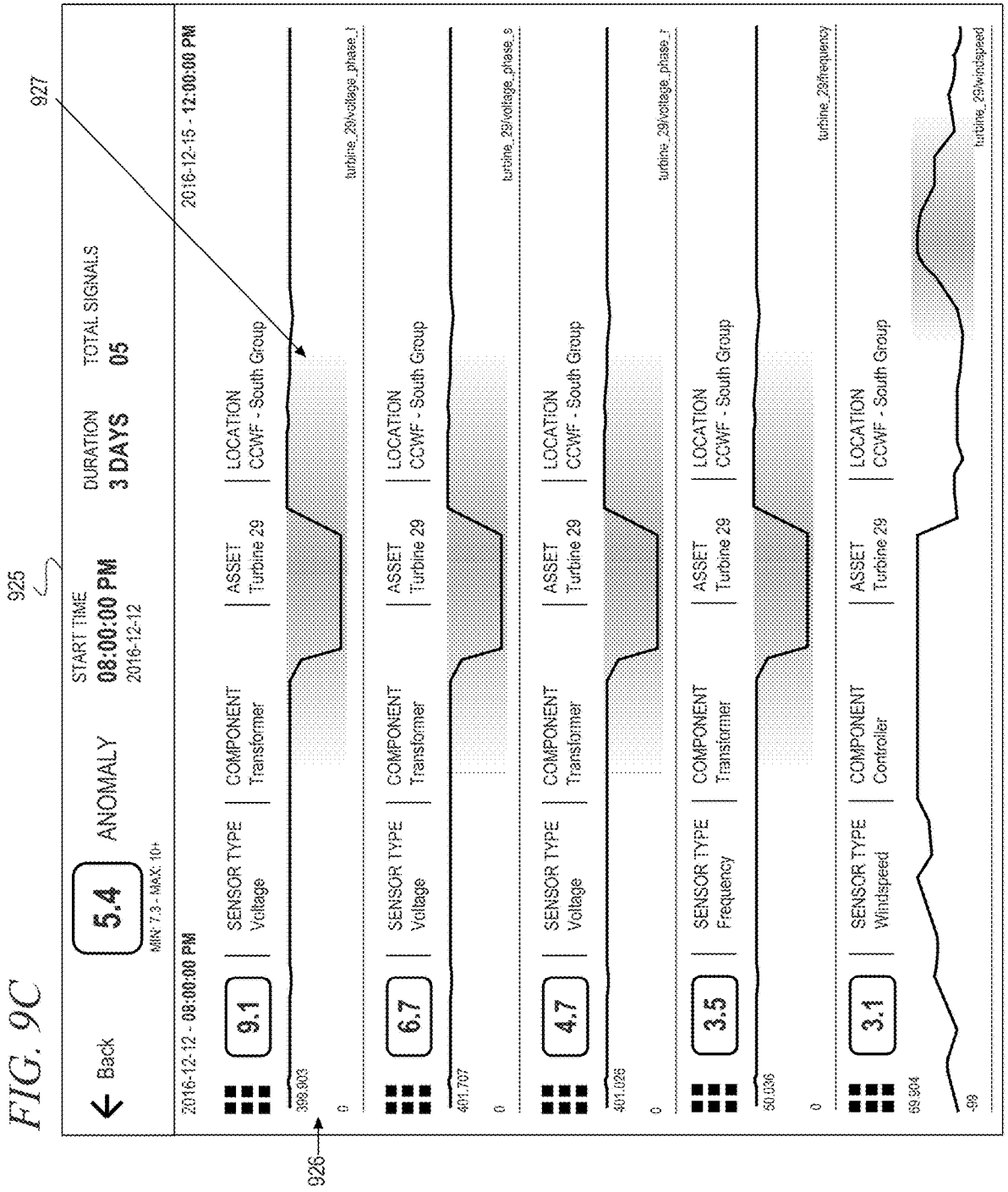
FIG. 9C is an example screen of an anomaly diagnosis GUI showing a detailed view for a selected anomaly group with a graphical representation of sensor signals and anomaly signals in accordance with an illustrative embodiment.

FIG. 9C is an example screen of an anomaly diagnosis GUI showing a detailed view for a selected anomaly group with a graphical representation of sensor signals and anomaly signals in accordance with an illustrative embodiment. In response to a selection of button 903, for example, the anomaly diagnosis GUI 925 presents a detailed view graphical representations of anomaly group 920. The anomaly diagnosis GUI 925 shows a graphical representation of each sensor signal in the anomaly group. The graphical representation of each sensor signal includes a sensor signal waveform 926 and an anomaly signal heat map 927 overlaid on top of the sensor signal waveform 926 as shading such that darker shading indicates higher anomaly value and lighter shading indicates lower anomaly value.

As shown in FIG. 9C, the anomaly heat map 927 for the first four sensor signals substantially align, indicating that the anomaly signals for these four sensor signals behave in a very similar manner. The fifth anomaly heat map does not align as well; however, the anomaly signals are similar enough to be considered an anomaly group based on results of the clustering algorithm.

Figure 10:
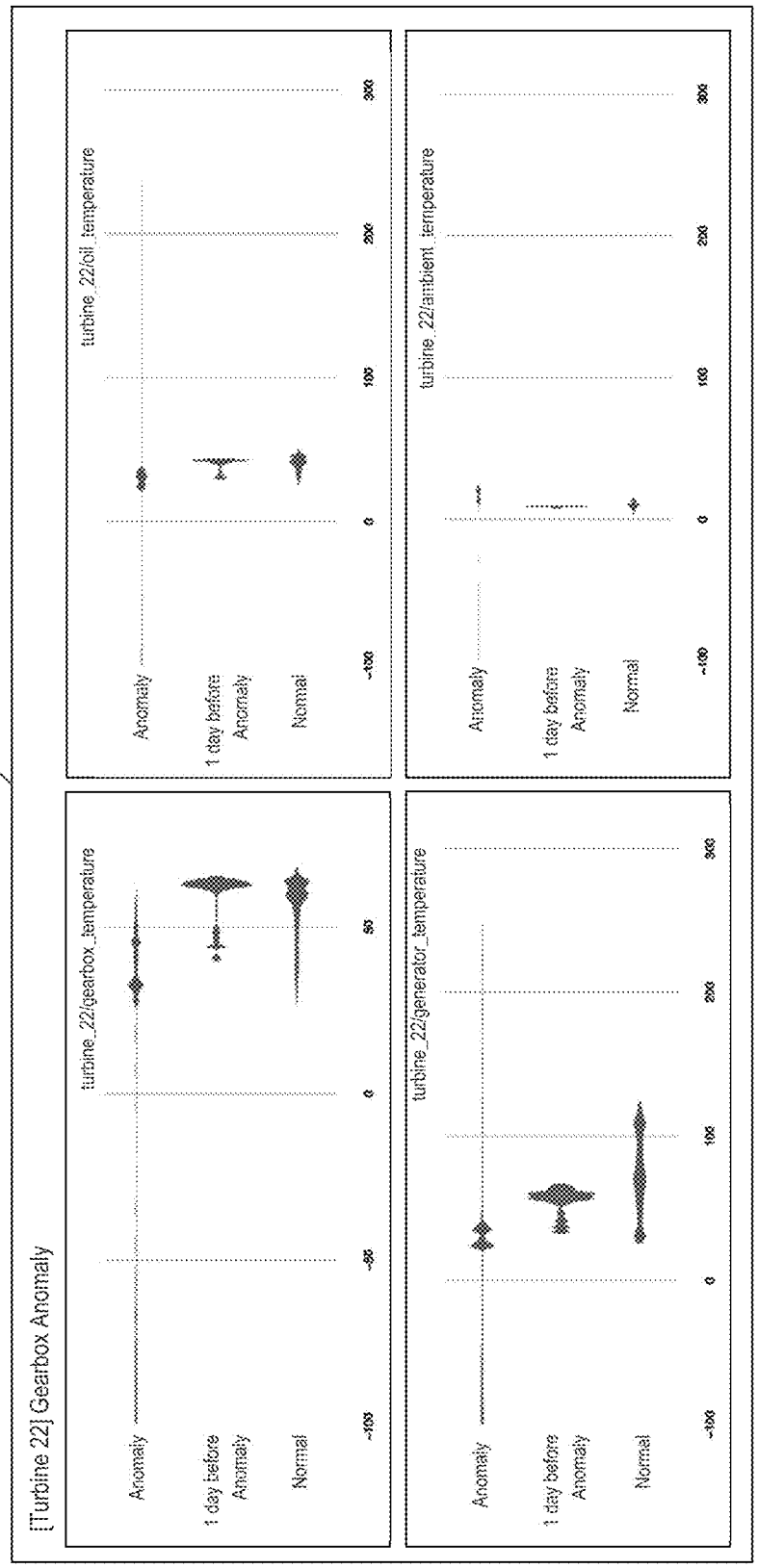
FIG. 10 is an example screen of an anomaly diagnosis GUI showing a signal value distribution view for a selected anomaly group in accordance with an illustrative embodiment.

FIG. 10 is an example screen of an anomaly diagnosis GUI showing a signal value distribution view for a selected anomaly group in accordance with an illustrative embodiment. The anomaly diagnosis GUI 1000 presents a signal value distribution (SVD) view for the sensor signals in anomaly group 910. In one embodiment, the SVD view includes a distribution or histogram for each sensor signal in the anomaly group, including a distribution for the time interval of the anomaly, a distribution for a day before the anomaly, and the normal distribution for the sensor signal. In the example shown in FIG. 10, the SVD view in anomaly diagnosis GUI 1000 includes an SVD view for each sensor signal in the anomaly group shown in FIG. 9B, including "turbine_22/gearbox_temperature," "turbine_22/oil_temperature," "turbine_22/generator_temperature," and "turbine_22/ambient_temperature." The x-axis of each SVD represents signal values, from 1 before the detected anomaly time interval to after the end of the detected anomaly time interval. The y-axis of each SVD represents a probability distribution for the signal.

In other embodiments, the anomaly diagnosis GUI 1000 could be presented in response to a selection of the label of a sensor signal, whether the label is displayed within the signal tree or shown elsewhere in the GUI. The GUI generator service 260 or another set of instructions that can be executed by the anomaly diagnosis system 102 can determine which four figures to display given the sensor signal associated with an anomaly. For example, the given sensor signal and three others represented by sibling nodes in the signal tree can be displayed for the time interval of the anomaly, one day before, and a normal condition, to enable a comparative analysis.

Figure 11:
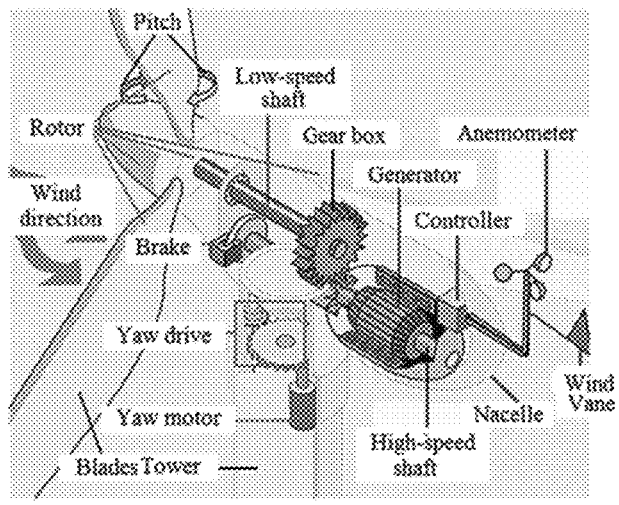
FIG. 11 is an example screen of an anomaly diagnosis GUI showing findings and analysis of an anomaly in accordance with an illustrative embodiment.

FIG. 11 is an example screen of an anomaly diagnosis GUI showing findings and analysis of an anomaly in accordance with an illustrative embodiment. The anomaly diagnosis GUI 1100 can be presented in response to a selection of a GUI element associated with an anomaly group. The anomaly diagnosis GUI 1100 presents a description of the anomaly and a diagrammatic view of the asset or component contributing to the anomaly. The anomaly diagnosis GUI 1100 provides information that assists a user in diagnosing a particular anomaly. In particular, it shows not only information regarding Turbine 22 but also information regarding Turbine 25, where these two turbines are represented by siblings in a signal tree. In one embodiment, the anomaly diagnosis GUI can prompt the user to send control signals to components of the physical system to resolve an issue with the component that may be causing the anomalous behavior.

5. Example Processes

Aspects of the illustrative embodiments are described herein with reference to flowchart illustrations. It will be understood that each block of the flowchart illustrations and combinations of blocks in the flowchart illustrations can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, implement the activities specified in the flowcharts.

The flowchart and block diagrams in the figures illustrate the architecture, functionality, and operation of possible implementations of systems, methods, and computer readable storage media according to various embodiments. In this regard, each block in the flowchart may represent a module, segment, or portion of instructions, which comprises one or more executable instructions for implementing the specified logical functions. In some alternative implementations, the functions noted in a block can occur out of the order noted in the figures. For example, two blocks shown in succession can, in fact, be executed substantially concurrently, or the blocks can sometimes be executed in the reverse order, depending upon the functionality involved.

Figure 12:
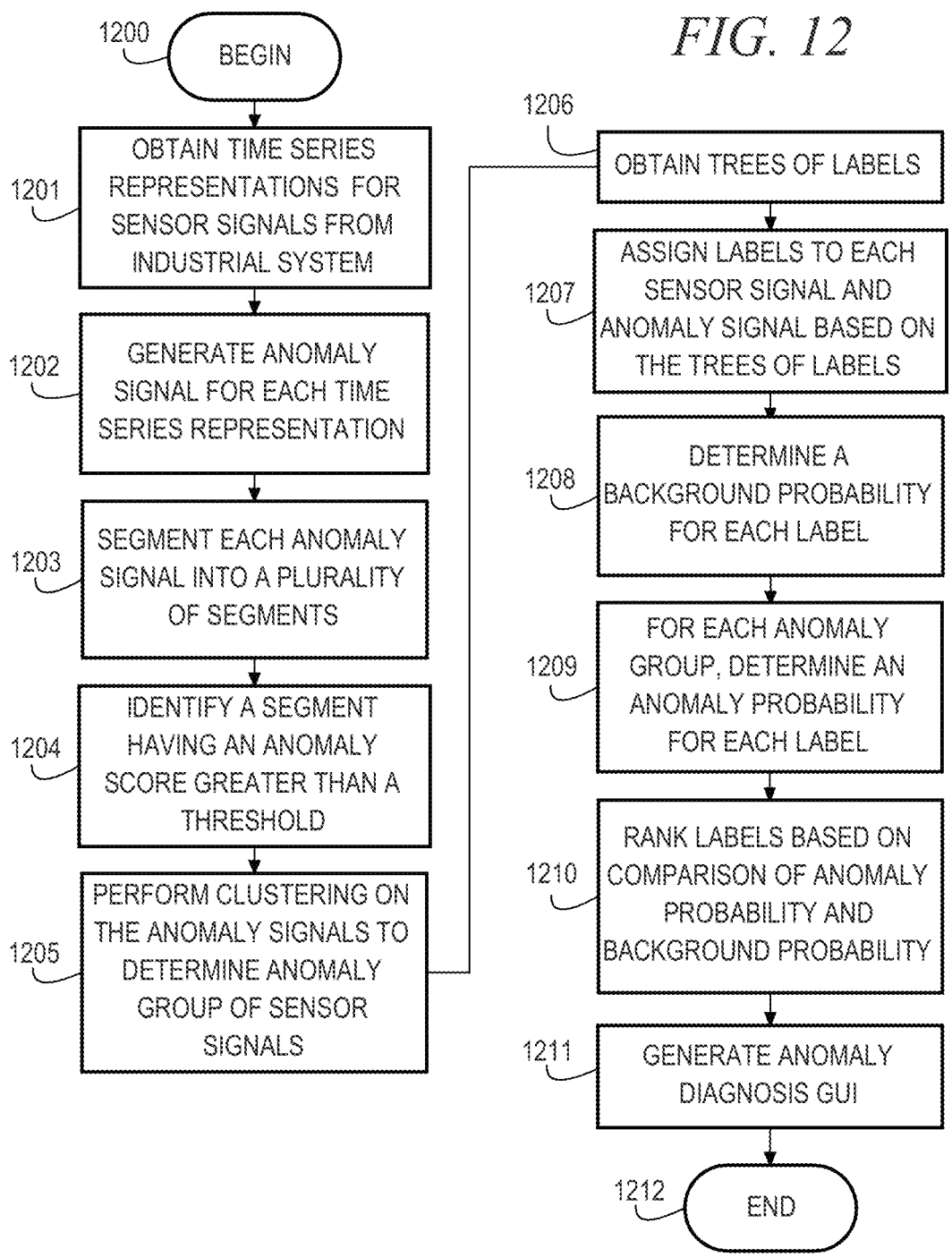
FIG. 12 is a flowchart illustrating operation of an anomaly diagnosis system for identifying sensor signals that contribute to anomalous behavior in a physical system in accordance with an illustrative embodiment.

FIG. 12 is a flowchart illustrating operation of an anomaly detection and diagnosis system for identifying sensor signals that contribute to anomalous behavior in a physical system in accordance with an illustrative embodiment. The process described can be performed by a single program or multiple programs. The steps of the process as shown in FIG. 12 may be implemented using processor-executable instructions that are stored in computer memory. Each step in FIG. 12 may represent a module, segment, or portion of instructions that comprises one or more executable instructions for implementing the specified logical functions. In some alternative implementations, the functions in the steps may occur out of the order noted in the figure. For example, two steps shown in succession may, in fact, be executed substantially concurrently, or the steps may sometimes be executed in the reverse order, depending on the functionality involved. For the purposes of providing a clear example, the steps of FIG. 12 are described as being performed by computer programs executing on the anomaly diagnosis system 102. For the purposes of clarity, the process described may be performed with more or fewer steps than described in FIG. 12.

Operation begins (block 1200), and the anomaly diagnosis system obtains representations of time series for sensor signals from the physical system (block 1201). Each time series representation includes an embedding for each time period in the time series. Each embedding includes an encoding of a plurality of values that represent the sensor signal during the time period. The anomaly diagnosis system generates an anomaly signal for each time series representation (block 1202). The anomaly signal includes an anomaly value for each embedding in the time series representation. The anomaly diagnosis system segments each anomaly signal into a plurality of time segments such that each time segment represents a change in the anomaly signal relative to a previous time segment (block 1203).

The anomaly diagnosis system identifies a time segment of an anomaly signal having an anomaly score that is greater than a threshold (block 1204). In one embodiment, the anomaly diagnosis system determines an anomaly score for each time segment and compares an anomaly value or score of each time segment of the anomaly signal to a predetermined threshold. For example, the anomaly diagnosis system can compare a mean or maximum anomaly value or score for each time segment to a predetermined number (e.g., three standard deviations).

The anomaly diagnosis system performs clustering on the anomaly signals to determine an anomaly group of sensor signals (block 1205). In one embodiment, the anomaly diagnosis system performs clustering to find anomaly signals that behave in a similar manner to each given anomaly signal that is identified to have a time interval associated with a high anomaly score. The anomaly diagnosis system performs clustering on the anomaly signals to determine which anomaly signals have similar shapes, i.e., have similar anomaly values at similar times.

The anomaly diagnosis system obtains signal trees representing all sensor signals and having associated metadata labels (block 1206). The anomaly diagnosis system assigns labels to the sensor signals and anomaly signals based on the signal trees representing all sensor signals (block 1207). In one embodiment, the anomaly diagnosis system assigns labels to a given sensor signal or anomaly signal for each node the given sensor signal or anomaly signal is under in the trees of metadata labels.

The anomaly diagnosis system determines a background probability for each label based on a probability the label is in the signal trees (block 1208). Then, for each anomaly group, the anomaly diagnosis system determines an anomaly probability for each label (block 1209). The anomaly probability is a probability that a given label appears in a given anomaly group. The anomaly diagnosis system then ranks the labels based on a comparison of anomaly probability and background probability (block 1210). In one embodiment, the anomaly diagnosis system can determine a top asset label, a top component label, and a top signal type label for each anomaly group.

Then, the anomaly diagnosis system generates an anomaly diagnosis GUI (block 1211). The anomaly diagnosis GUI presents anomaly groups with their aggregate anomaly scores, and associated metadata labels. In one embodiment, the anomaly diagnosis GUI presents a detailed view for an anomaly group, including a sensor signal waveform, an anomaly heat map overlaid on top of the sensor signal waveform, an anomaly score for the anomaly group, a number of sensor signals in the anomaly group, and labels assigned to the anomaly group. The anomaly diagnosis GUI can also present further information, including a signal value distribution view or a descriptive view with information that helps a user to diagnose the anomaly. Thereafter, operation ends (block 1212).

6. Hardware Implementation

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
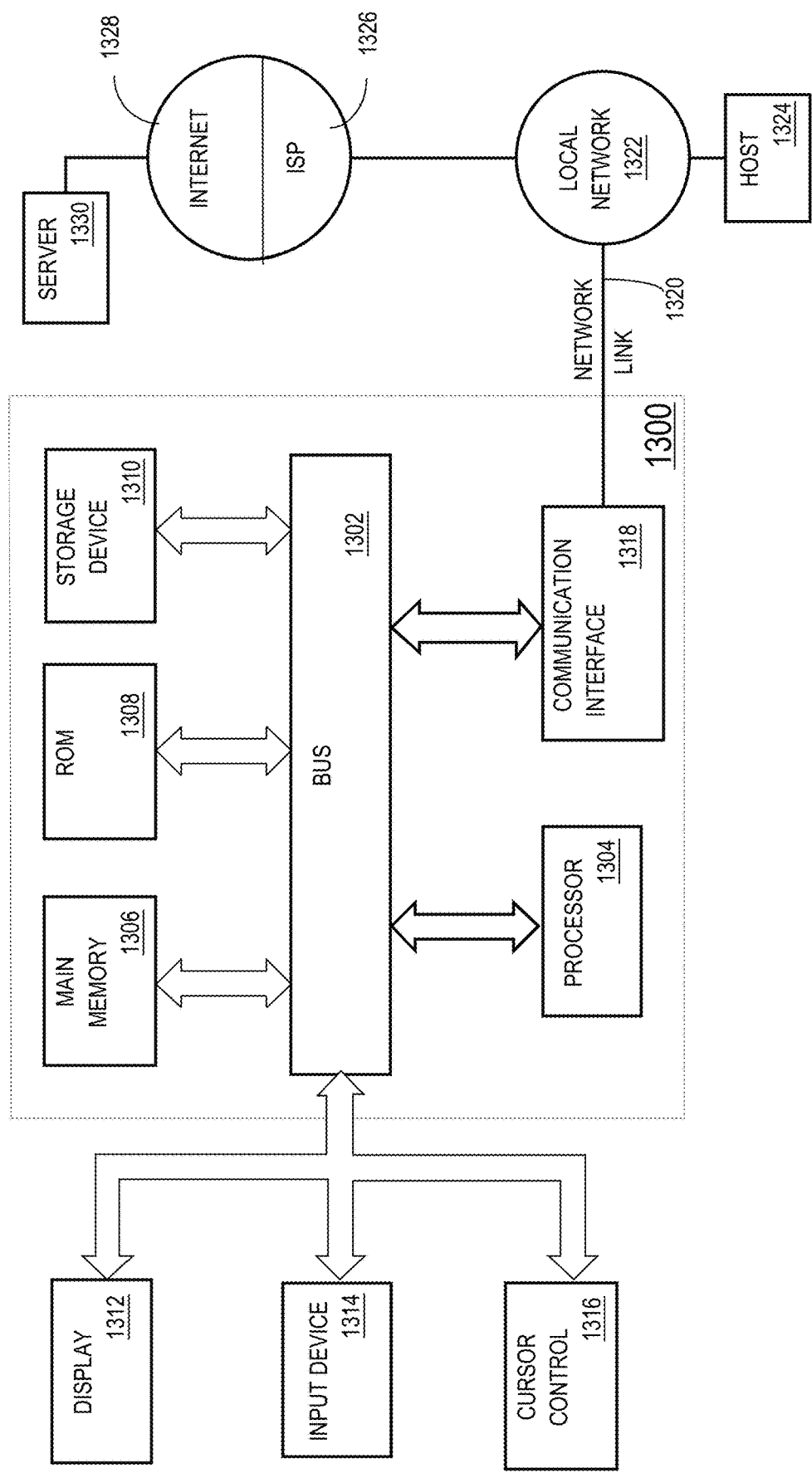
FIG. 13 is a block diagram that illustrates a computer system upon which an embodiment of the invention may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general-purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

7. Extensions and Alternatives

In other embodiments, the anomaly diagnosis system can present the user with remediation steps for anomalies. The anomaly diagnosis system can use machine learning techniques to find previous anomalies that are similar to the given anomaly and recall the steps that users have taken to remediate those previous anomalies based at least in part on the metadata labels assigned to the anomaly groups. For example, the anomaly diagnosis system can predict with a degree of confidence that for an anomaly group including a set of sensor signals and a set of metadata labels, a certain set of remediation steps are taken by users. In some embodiments, the anomaly diagnosis system can prompt the user to execute remediation steps, and in response to user interaction, the anomaly diagnosis system can execute the remediation steps automatically.

In the foregoing specification, embodiments of the invention have been described with reference to numerous specific details that can vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of managing time series data, comprising:
    obtaining, by a processor, a plurality of anomaly signals corresponding to a plurality of sensor signals of a physical system, wherein each anomaly signal comprises an anomaly value for each of a plurality of time durations during a period of time;

segmenting, by the processor, one or more anomaly signals within the plurality of anomaly signals into a plurality of time segments, wherein each time segment in the plurality of time segments represents a change in the one or more anomaly signals relative to a previous time segment;

determining, by the processor, an anomaly score for each time segment in the plurality of time segments based on anomaly values of the one or more anomaly signals during the time segment;

identifying, by the processor, an anomaly time interval corresponding to at least one consecutive time segment within the plurality of time segments;

clustering, by the processor, the plurality of anomaly signals within the anomaly time interval to identify an anomaly group of sensor signals associated with the anomaly time interval;

determining, by the processor, an aggregate anomaly score for the anomaly group of sensor signals;

generating, by the processor, a graphical user interface presenting a representation of the anomaly group of sensor signals and the aggregate anomaly score;

causing the graphical user interface to be displayed on a user device;

assigning one or more labels to each sensor signal based on one or more signal trees for the physical system, wherein each node in the one or more signal trees has an associated label and represents an attribute associated with a sensor signal;

for each label in the one or more signal trees, determining a background probability that the label occurs in the one or more signal trees;

for each label in the one or more signal trees, determining an anomaly probability that the label occurs in the anomaly group of sensor signals; and selecting a subset of labels based on a result of comparing the anomaly probability to the background probability, wherein the graphical user interface presents a graphical representation of the subset of labels in association with the anomaly group of sensor signals.

2. The computer-implemented method of claim 1, the anomaly value representing a degree to which the corresponding sensor signal differs from normal or expected values, determining the anomaly score being performed within the anomaly time interval over the corresponding anomaly signals.

3. The computer-implemented method of claim 1, wherein the attribute associated with the sensor signal comprises one of an asset, a component, a sensor type, or a location.

4. The computer-implemented method of claim 1, further comprising:

obtaining a time series representation for each of the plurality of sensor signals, wherein each time series representation comprises an embedding for each time duration within the period of time and wherein each embedding comprises an encoding of a set of values representing a sensor signal of the plurality of sensor signals during the corresponding time duration.

5. The computer-implemented method of claim 4, wherein each time series representation comprises embeddings for multiple time resolutions.

6. The computer-implemented method of claim 4, wherein obtaining the plurality of anomaly signals comprises:

obtaining a machine learning model trained on training data representing normal states of the physical system;

generating a predicted embedding for a given time duration for a given sensor signal based on embeddings for other sensor signals within the time duration using the machine learning model; and determining the anomaly value for the given sensor signal in the time duration based on a difference between a given embedding for the given sensor signal and the predicted embedding.

7. The computer-implemented method of claim 1, wherein identifying the anomaly time interval comprises selecting one or more consecutive time segments within the plurality of time segments having an anomaly score greater than a predetermined threshold.

8. The computer-implemented method of claim 7, wherein the predetermined threshold is a number of standard deviations of the corresponding sensor signal.

9. The computer-implemented method of claim 7, wherein the anomaly score for a given time segment is a maximum anomaly value or a mean anomaly value for the given time segment.

10. The computer-implemented method of claim 1, wherein determining the aggregate anomaly score for the anomaly group of sensor signals comprises:

determining an anomaly score for each anomaly signal corresponding to the anomaly group of sensor signals over the anomaly time interval; and determining the aggregate anomaly score as a mean of the anomaly scores for the anomaly group of sensor signals.

11. The computer-implemented method of claim 1, wherein the graphical user interface presents a plurality of anomaly groups of sensor signals sorted by aggregate anomaly score.

12. The computer-implemented method of claim 1, wherein the representation of the anomaly group of sensor signals comprises a graphical representation of an aggregate of each anomaly group of sensor signals, the method further comprising:

responsive to a user selecting a control associated with the graphical representation of the aggregate of the anomaly group of sensor signals, causing display of a graphical representation of each sensor signal within the anomaly group of sensor signals, wherein the graphical representation of each sensor signal comprises an anomaly time window overlaid on top of each sensor signal.

13. The computer-implemented method of claim 12, wherein the anomaly time window comprises an anomaly heat map representing anomaly values of the anomaly signal corresponding to the sensor signal.

14. The computer-implemented method of claim 1, wherein the representation of the anomaly group of sensor signals comprises at least one of a start time of the anomaly time interval, a top asset, a top component, a top signal, a duration, and a number of sensor signals within the anomaly group of sensor signals.

15. The computer-implemented method of claim 1, wherein segmenting the one or more anomaly signals comprises segmenting each anomaly signal within the plurality of anomaly signals into a plurality of time segments.

16. The computer-implemented method of claim 1, wherein segmenting the one or more anomaly signals comprises:
  segmenting a plurality of combinations of anomaly signals;
  determining an anomaly score for each combination of anomaly signals; and
  selecting a combination of anomaly signals from the plurality of combinations of anomaly signals having a highest anomaly score.

17. The computer-implemented method of claim 1, further comprising:
  sending a control signal to a component of the physical system that alters operation of the component,
  wherein a label representing the component has been assigned to a sensor signal of an anomaly group with a highest anomaly score.

18. One or more non-transitory storage media storing instructions which, when executed by one or more computing devices to perform a method of managing time series data, the method comprising:
  obtaining, by a processor, a plurality of anomaly signals corresponding to a plurality of sensor signals of a physical system, wherein each given anomaly signal comprises an anomaly value for each of a plurality of time durations during a period of time;
  segmenting, by the processor, one or more anomaly signals within the plurality of anomaly signals into a plurality of time segments, wherein each time segment in the plurality of time segments represents a change in the one or more anomaly signals relative to a previous time segment;
  determining, by the processor, an anomaly score for each time segment in the plurality of time segments based on anomaly values of the one or more anomaly signals during the time segment;
  identifying, by the processor, an anomaly time interval corresponding to at least one consecutive time segment within the plurality of time segments;
  clustering, by the processor, the plurality of anomaly signals within the anomaly time interval to identify an anomaly group of sensor signals associated with the anomaly time interval;
  determining, by the processor, an aggregate anomaly score for the anomaly group of sensor signals;
  generating, by the processor, a graphical user interface presenting a representation of the anomaly group of sensor signals and the aggregate anomaly score;
  causing the graphical user interface to be displayed on a user device;
  assigning one or more labels to each sensor signal based on one or more signal trees for the physical system, wherein each node in the one or more signal trees has an associated label and represents an attribute associated with a sensor signal;
  for each label in the one or more signal trees, determining a background probability that the label occurs in the one or more signal trees;
  for each label in the one or more signal trees, determining an anomaly probability that the label occurs in the anomaly group of sensor signals; and
  selecting a subset of labels based on a result of comparing the anomaly probability to the background probability,
  wherein the graphical user interface presents a graphical representation of the subset of labels in association with the anomaly group of sensor signals.

19. The one or more non-transitory storage media of claim 18,
  the anomaly value representing a degree to which the corresponding sensor signal differs from normal or expected values,
  determining the anomaly score being performed within the anomaly time interval over the corresponding anomaly signals.

20. The one or more non-transitory storage media of claim 18,
  wherein identifying the anomaly time interval comprises:
  determining an anomaly score for each time segment within the plurality of time segments; and
  selecting one or more consecutive time segments within the plurality of time segments having an anomaly score greater than a predetermined threshold.

* * * * *